US008489937B2

(12) United States Patent
Okada et al.

(10) Patent No.: US 8,489,937 B2
(45) Date of Patent: Jul. 16, 2013

(54) STORAGE SUBSYSTEM AND METHOD FOR CONTROLLING THE SAME

(75) Inventors: Gosuke Okada, Fujisawa (JP); Takashi Yamazaki, Hiratsuka (JP); Mamoru Motonaga, Kaisei (JP); Naoto Shiino, Oi (JP); Takashi Nozawa, Odawara (JP); Megumi Hokazono, Minamiashigara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/378,926

(22) PCT Filed: Dec. 6, 2011

(86) PCT No.: PCT/JP2011/006822
§ 371 (c)(1),
(2), (4) Date: Dec. 16, 2011

(65) Prior Publication Data
US 2013/0145223 A1 Jun. 6, 2013

(51) Int. Cl.
*G06F 11/00* (2006.01)
(52) U.S. Cl.
USPC .............................................. 714/42; 714/54
(58) Field of Classification Search
USPC .............. 714/42, 54, 6.1, 6.11, 6.12, 6.13, 714/6.3, 718
See application file for complete search history.

(56) References Cited

U.S. PATENT DOCUMENTS

| | | | | |
|---|---|---|---|---|
| 5,970,430 | A * | 10/1999 | Burns et al. | 702/122 |
| 6,446,090 | B1 * | 9/2002 | Hart | 711/112 |
| 7,571,277 | B2 * | 8/2009 | Mizushima | 711/103 |
| 8,046,446 | B1 * | 10/2011 | Karr et al. | 709/223 |
| 2007/0050670 | A1 * | 3/2007 | Shigemura et al. | 714/7 |

FOREIGN PATENT DOCUMENTS

| | | |
|---|---|---|
| EP | 2 112 654 A1 | 10/2009 |
| JP | 2007-065788 | 3/2007 |

OTHER PUBLICATIONS

PCT International Search Report and Written Opinion on application PCT/JP2011/006822 mailed May 29, 2012; 10 pages.

* cited by examiner

*Primary Examiner* — Dieu-Minh Le
(74) *Attorney, Agent, or Firm* — Foley & Lardner LLP

(57) ABSTRACT

In storage subsystems, due to the significant increase in HDD capacity, the time for executing online verification is elongated, affecting accesses from the host computer. By comprehending the status of accesses to the HDD, the sections where error has occurred and the status of restoration thereof, it becomes possible to detect defective or error sections efficiently at an early stage, according to which the reliability and access performance of the storage subsystem can be improved. The present storage subsystem executes one or more of the following processes: (M1) intensive verification of a circumference of an error LBA, (M2) an area-based prioritized verification, and (M3) continuous verification performed for a long period of time to (V1) an area in which error has occurred via IO access, (V2) a highly accessed area, and (V3) during a period of time when IO access is low.

18 Claims, 29 Drawing Sheets

Fig. 6

| Chassis-HDD Slot 6101 | Manufacturer 6102 | Model Name 6103 | Serial Number 6104 | Type 6105 | Capacity (TB) 6106 | Rotation Frequency (RPM) 6107 | Maximum LBA 6108 | Last Verified LBA 6109 | Last Verification Time 6110 | Initial LBA 6111 | End LBA 6112 |
|---|---|---|---|---|---|---|---|---|---|---|---|
| 1-10 | HTC | DKS** | 6MN** | SAS | 1 | 12000 | MX1 | CL10 | 10:10 | SL10 | EL10 |
| 2-11 | HTC | DKS** | 6MN** | SAS | 1 | 12000 | MX1 | CL11 | 11:11 | SL11 | EL11 |
| ... | ... | ... | ... | ... | ... | ... | ... | ... | ... | ... | ... |
| 2-20 | HTC | DKT** | 8SA** | SATA | 3 | 7200 | MX2 | CL20 | 20:20 | SL20 | EL20 |
| 2-21 | HTC | DKT** | 8SA** | SATA | 3 | 7200 | MX2 | CL21 | 21:21 | SL21 | EL21 |
| ... | ... | ... | ... | ... | ... | ... | ... | ... | ... | ... | ... |
| 1-01 | HTC | DKD** | 9SD** | SSD | 0.2 | — | MX3 | CL30 | 01:01 | SL30 | EL30 |
| 1-02 | HTC | DKD** | 9SD** | SSD | 0.2 | — | MX3 | CL31 | 02:02 | SL31 | EL31 |
| ... | ... | ... | ... | ... | ... | ... | ... | ... | ... | ... | ... |

(a1) IO access occurs to area number = 1500 (Area-based IO access frequency table) 1201

| Access Number | 1 | 2 | 3 | 4 | 5 |
|---|---|---|---|---|---|
| Area Number | 1500 | | | | |
| Count | 1 | | | | |

(a2) IO access occurs to area number = 2000

| Access Number | 1 | 2 | 3 | 4 | 5 |
|---|---|---|---|---|---|
| Area Number | 2000 | 1500 | | | |
| Count | 1 | 1 | | | |

(a3) IO access occurs to area numbers = 5000, 6000, 7000

| Access Number | 1 | 2 | 3 | 4 | 5 |
|---|---|---|---|---|---|
| Area Number | 7000 | 6000 | 5000 | 2000 | 1500 |
| Count | 1 | 1 | 1 | 1 | 1 |

(a4) IO access occurs to area number = 1500

| Access Number | 1 | 2 | 3 | 4 | 5 |
|---|---|---|---|---|---|
| Area Number | 1500 | 7000 | 6000 | 5000 | 2000 |
| Count | 2 | 1 | 1 | 1 | 1 |

(a5) IO access occurs to area number = 9000

| Access Number | 1 | 2 | 3 | 4 | 5 |
|---|---|---|---|---|---|
| Area Number | 9000 | 1500 | 7000 | 6000 | 5000 |
| Count | 1 | 2 | 1 | 1 | 1 |

| Deletion | 2000 |
|---|---|
| | 1 |

Method for measuring time of each area: Counts are managed as access time (b1) Count IO access time of each area (Area-based IO access time table) 1202

| Access Number | 1 | 2 | 3 | 4 | 5 |
|---|---|---|---|---|---|
| Area Number | 9000 | 1500 | 7000 | 6000 | 5000 |
| Time (min) | 10 | 30 | 5 | 10 | 15 |

| | | Day of week | | | | | | | 1501 |
|---|---|---|---|---|---|---|---|---|---|
| | | Mon | Tue | Wed | Thu | Fri | Sat | Sun | |
| Time | 0:00-6:00 | m(1,1) | m(1,2) | m(1,3) | m(1,4) | m(1,5) | m(1,6) | m(1,7) | |
| | 6:00-12:00 | m(2,1) | m(2,2) | m(2,3) | m(2,4) | m(2,5) | m(2,6) | m(2,7) | |
| | 12:00-18:00 | m(3,1) | m(3,2) | m(3,3) | m(3,4) | m(3,5) | m(3,6) | m(3,7) | |
| | 18:00-24:00 | m(4,1) | m(4,2) | m(4,3) | m(4,4) | m(4,5) | m(4,6) | m(4,7) | | m (x, y) : x represents period of time, y represents day of week, 0 <= m (x, y) <= IO_max

Fig. 18

Table 1801:

| Time | Day of week | | | | | | |
|---|---|---|---|---|---|---|---|
| | Mon | Tue | Wed | Thu | Fri | Sat | Sun |
| 0:00-6:00 | n(1,1)=1 | n(1,2)=1 | n(1,3)=1 | n(1,4)=1 | NULL | n(1,6)=3 | n(1,7)=5 |
| 6:00-12:00 | NULL | NULL | NULL | NULL | NULL | NULL | n(2,7)=5 |
| 12:00-18:00 | NULL | NULL | NULL | NULL | NULL | NULL | n(3,7)=5 |
| 18:00-24:00 | NULL | NULL | NULL | NULL | n(4,5)=2 | n(4,6)=3 | n(4,7)=5 |

$n(x, y) = z$ : x represents period of time, y represents day of week, z represents verification execution time, verification is executed except for NULL Table 1802:

| Time | Day of week | | | | | | |
|---|---|---|---|---|---|---|---|
| | Mon | Tue | Wed | Thu | Fri | Sat | Sun |
| 0:00-1:00 | n(1,1)=1 | n(1,2)=1 | NULL | NULL | NULL | n(1,6)=1 | n(1,7)=5 |
| 1:00-2:00 | NULL | n(1,2)=1 | NULL | NULL | NULL | n(1,6)=1 | |
| 2:00-3:00 | NULL | NULL | n(1,3)=1 | NULL | NULL | NULL | |
| 3:00-4:00 | NULL | NULL | NULL | n(1,4)=1 | NULL | NULL | |
| 4:00-5:00 | NULL | NULL | NULL | NULL | NULL | NULL | |
| 5:00-6:00 | NULL | NULL | NULL | NULL | NULL | n(1,6)=1 | |

Fig. 25

| | Normal | | Long-time continuous verification invoked | |
|---|---|---|---|---|
| | Allocated storage area | Non-allocated storage area | Allocated storage area | Non-allocated storage area |
| Allocation of area via thin provisioning not considered | Normal verification | Normal verification | Long-time continuous verification (Fixed verification execution time) | Long-time continuous verification (Fixed verification execution time) |
| Consider only allocation of area | Normal verification | No execution of verification | Long-time continuous verification (Fixed verification execution time) | No execution of verification |
| Consider only whether long-time continuous verification is invoked | Normal verification | Normal verification | Long-time continuous verification (Variable verification execution time) | Long-time continuous verification (Variable verification execution time) |
| Consider both allocation of area and whether long-time continuous verification is invoked | Normal verification | No execution of verification | Long-time continuous verification (Variable verification execution time) | No execution of verification |

2501

STORAGE SUBSYSTEM AND METHOD FOR CONTROLLING THE SAME

TECHNICAL FIELD

The present invention relates to a storage subsystem and a method for controlling the same, and more specifically, relates to an operation for verifying hard disk drives and the method for managing the same.

BACKGROUND ART

Recently, along with the explosive increase of the amount of information and data used in companies and ministries, the amount of data and the capacity of stored data processed in large-scale computers such as host computers, servers and storage subsystems and the like coupled to host computers have increased significantly. Especially, unlike servers and other information processing systems, storage subsystems are specialized devices for storing data, utilizing a large number of hard disks which are data storage media having large capacity and high reliability, which are managed and operated via a RAID (Redundant Array of Inexpensive Disks) system.

Further, the cost of storage subsystems are recently reduced, and along therewith, the types of hard disk drives (hereinafter referred to as HDDs) adopted in storage subsystems have changed from expensive and highly reliable fiber channel (hereinafter referred to as FC) types to more inexpensive SAS (Serial Attached SCSI) types, and now, even more inexpensive SATA (Serial AT Attachment) types are now starting to be used widely.

However, the SAS disks and SATA disks are inexpensive, but the reliabilities thereof are low compared to FC disks. Thus for example, the simple replacement of FC disks as HDDs in storage subsystems by SAS disks or SATA disks will deteriorate the reliability of the whole storage subsystem.

Further, along with the recent advancement in high density recording technology, the increase in capacity of HDDs is enhanced. There is fear that along therewith, physical defects due to scratches and other damages (such as defects caused during fabrication and scrapes caused by head contact) formed on the surface of the media as recording section of the HDD or read errors caused by insufficient recording may increase the frequency of occurrence of uncorrectable errors and correctable errors. In order to prevent loss of information caused by defects and the like, patent literature 1 teaches detecting defective sections and defective areas from the whole storage area of the HDD through verification (such as verifying operation or cyclic redundancy check (CRC)) and data restoring operation such as alternate processing of the defective areas while the storage subsystem is operating.

In other words, the storage subsystem processes data access requests from the host computer while executing verification concurrently. Such verification is called online verification, which is executed asynchronously as the data access processing. The prior art technology relates to such online verification is taught for example in patent literature 1, disclosing performing online verification processing in different cycles for the system area and the data area.

CITATION LIST

Patent Literature

PTL 1: Japanese Patent Application Laid-Open Publication No. 2007-065788(US Patent Application Publication No. 2007/0050670)

SUMMARY OF INVENTION

Technical Problem

If the capacity of a single HDD is small, the time required to verify all the storage areas within the HDD will be short, and the verification has only very little influence on the accesses from the host computer. However, due to the increase in capacity of the HDD accompanying the recent advancement in high recording density, the capacity of a single SAS disk or a single SATA disk has exceeded a few hundred GB and reached TBs. Along therewith, the capacity of RAID groups and storage pool capacities composed of these types of HDDs have increased significantly. Therefore, the time required for executing verification to the whole storage areas of the HDD has increased rapidly, and prioritized execution of verification affects the accesses from the host computer significantly.

On the other hand, if accesses from the host computer are prioritized, an extremely long time is required to complete verification of the whole storage areas. In other words, the interval from a verification executed to a specific area to the subsequent verification executed to the same specific area is long, and during such long interval, new defects and error sections occur within that area. This problem not only relates to HDDs but also to SSDs (Solid State Drives) adopting nonvolatile semiconductor memories as storage media.

Therefore, the object of the present invention is to execute online verification while considering the state of use of memory devices such as HDDs and SSDs from the host computer and the state of errors or restoration of errors, to thereby detect defects and error sections efficiently and at an early stage so as to improve the reliability of the storage subsystem.

Solution to Problem

In order to achieve the above object, the present invention executes, in addition to normal online verification, a unique online verification of the present invention (V1) when an error occurs to a specific LBA of the HDD via an IO access from a host computer, (V2) to an area (LBA area) where the access frequency is high or the access time is long, and (V3) during a period of time where IO access frequency is low.

Further according to the present invention, a disk I/F control unit executes one or more of the following verifications: (M1) an intensive verification of a circumference of the error-detected LBA, (M2) an area-based prioritized verification, and (M3) a long-time continuous verification. In addition, the present invention may not perform verification of an area in the HDD corresponding to a page not allocated to a virtual area by the aforementioned thin-provisioning function.

Advantageous Effects of Invention

The present invention can detect defects and error sections of memory devices such as HDDs and SSDs which are physical storage means of the storage subsystem at an early stage, and to enable high speed verification of all areas of the storage means. Therefore, the present invention enables to improve the reliability of the storage subsystem and to enhance the performance of access from host computers and other high-level devices.

BRIEF DESCRIPTION OF DRAWINGS

FIG. 6 is a view showing an example of configuration of a verification status monitor table.

FIG. 12 is a view showing a configuration example of an area-based IO access frequency table according to the present invention.

FIG. 18 is a view showing a configuration example of a verification execution table according to the present invention.

FIG. 25 is a view showing a configuration example of a verification management table according to the present invention.

DESCRIPTION OF EMBODIMENTS

Figure 1:
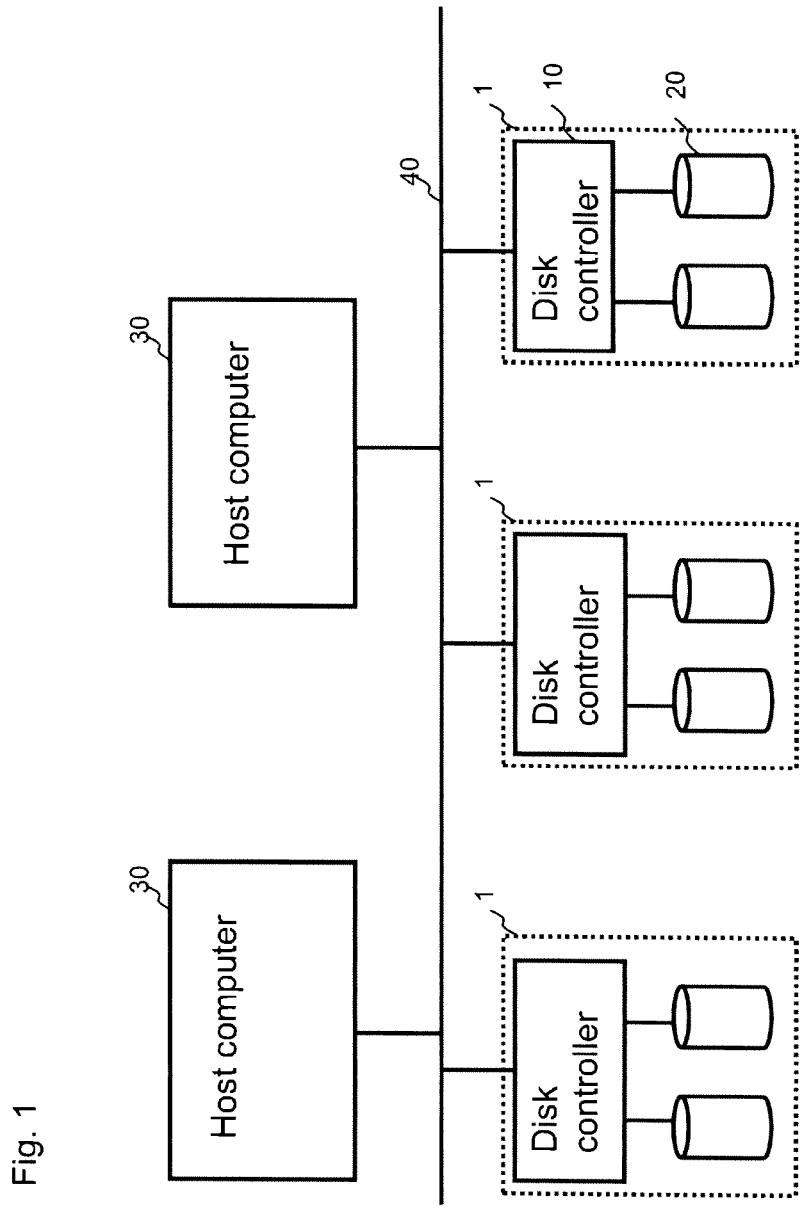
FIG. 1 is a view showing an overall configuration of a storage system adopting a storage subsystem according to the present invention.

Now, the preferred embodiments of the present invention will be described with reference to the drawings. Various information may be described via terms such as management table" in the following description, but the various information can be expressed via a data structure other than tables. The "management table" can also be called "management information" to show that the information does not depend on the data structure.

The processes may be described using a "program" as the subject. A program is implemented via a processor such as a CPU (Central Processing Unit) to perform a predetermined process. The subject of the processes may be the processor, since the processes are performed using storage resources (such as memories) and communication interface units (such as communication ports) arbitrarily. The processor may have a dedicated hardware in addition to the CPU. The computer program may be installed to the respective computers from a program source. The program source can be provided for example from a program distribution server or a storage media.

Each element such as a PD (Physical Device) or a page can be identified via numbers, but other types of identification information such as names can be used to identify information. The equivalent elements are provided with the same reference numbers in the drawings and the description of the present invention, but the present invention is not restricted to the present embodiments, and other possible modified examples that correspond to the present invention are included in the technical range of the present invention. The number of each component can be one or more than one unless defined otherwise.

With reference to FIGS. 1 through 10, the method for executing verification intensively of the circumference of an error-detected LBA which is one embodiment of an intelligent verification according to the present invention will be described. According to the verification method of the circumference of the error-detected LBA, when an error occurs to the HDD accessing data when the host computer accesses the storage subsystem, a disk I/F control unit executes verification independently. Therefore, the present verification differs from a normal online verification which is periodically performed by a controller unit, however, the intelligent verification processing according to the present invention can be combined with the normal online verification process.

Verification is a function for checking all areas of the storage media of the hard disk in the HDD, detecting error sections and restoring the same. In order to maintain high reliability in a storage subsystem, it is necessary to periodically execute verification and immediately restore the sections where error has been detected. However, the storage subsystem must operate constantly for 24 hours a day, 365 days a year. Therefore, it is impossible to stop the storage subsystem and execute verification. Thus, the HDD is subjected to verification while the system is operating, the operation of which is called online verification. Each HD performs online verification independently, and in the system, a plurality of HDDs are simultaneously executing online verification concurrently.

According to a general outline of the verification processing executed via the disk I/F control unit, verification is performed to a plurality of continuous LBAs (circumference LBAs) anterior and posterior to the LBA (Logical Block Address) to which error has occurred, so as to detect hidden errors and to restore errors. There is a possibility that undetected error sections exist around the error-detected LBA due to physical flaws, temporary write errors and the like. In addition, there is a high possibility that the host computer re-accesses a nearby LBA. Therefore, with the aim to eliminate undetected errors prior to the access from the host computer, online verification is executed intensively to the circumference of the error-detected LBA.

Thus, the storage subsystem can have enhanced reliability with respect to the data processing of the host computer. The LBA refers to the address within the HDD, which is the address information specifying the data area within the HDD in sector units, track units or cylinder units. Therefore, the LBA differs from the virtual LBA indicating the address of the virtual logical device 71, the logical LBA indicating the address of the logical device 81 or the physical LBA indicating the address of the physical device within the system, but the physical LBA has a one-to-one correspondence with the aforementioned LBA within the HDD in the system.

<System Configuration>
<Overall Configuration of Storage System>

At first, the overall configuration of the storage subsystem will be described with reference to FIG. 1, and the internal configuration of the storage subsystem will be described with reference to FIG. 2. FIG. 1 is a view showing the overall configuration of a storage system having adopted the storage subsystem according to the present invention. The storage system is composed of storage subsystems 1 and host computers 30, which are mutually coupled via a network 40. The storage subsystem 1 is mainly composed of a disk controller unit 10 and a disk unit 20 controlled via the disk controller unit 10.

<Storage Subsystem Configuration>

Next, the internal configuration of the storage subsystem 1 will be described with reference to FIG. 2. The storage subsystem 1 is composed of a storage controller chassis 11, a disk chassis 12 (basic disk chassis) and a disk chassis 13 (expansion disk chassis). The storage subsystem 1 is capable of providing a large amount of storage areas to the host computer 30 or the like by arranging a plurality of HDDs in arrays for storing data. Further, the storage subsystem 1 constitutes a RAID structure from the plurality of HDDs to realize redundancy of storage data.

Figure 2:
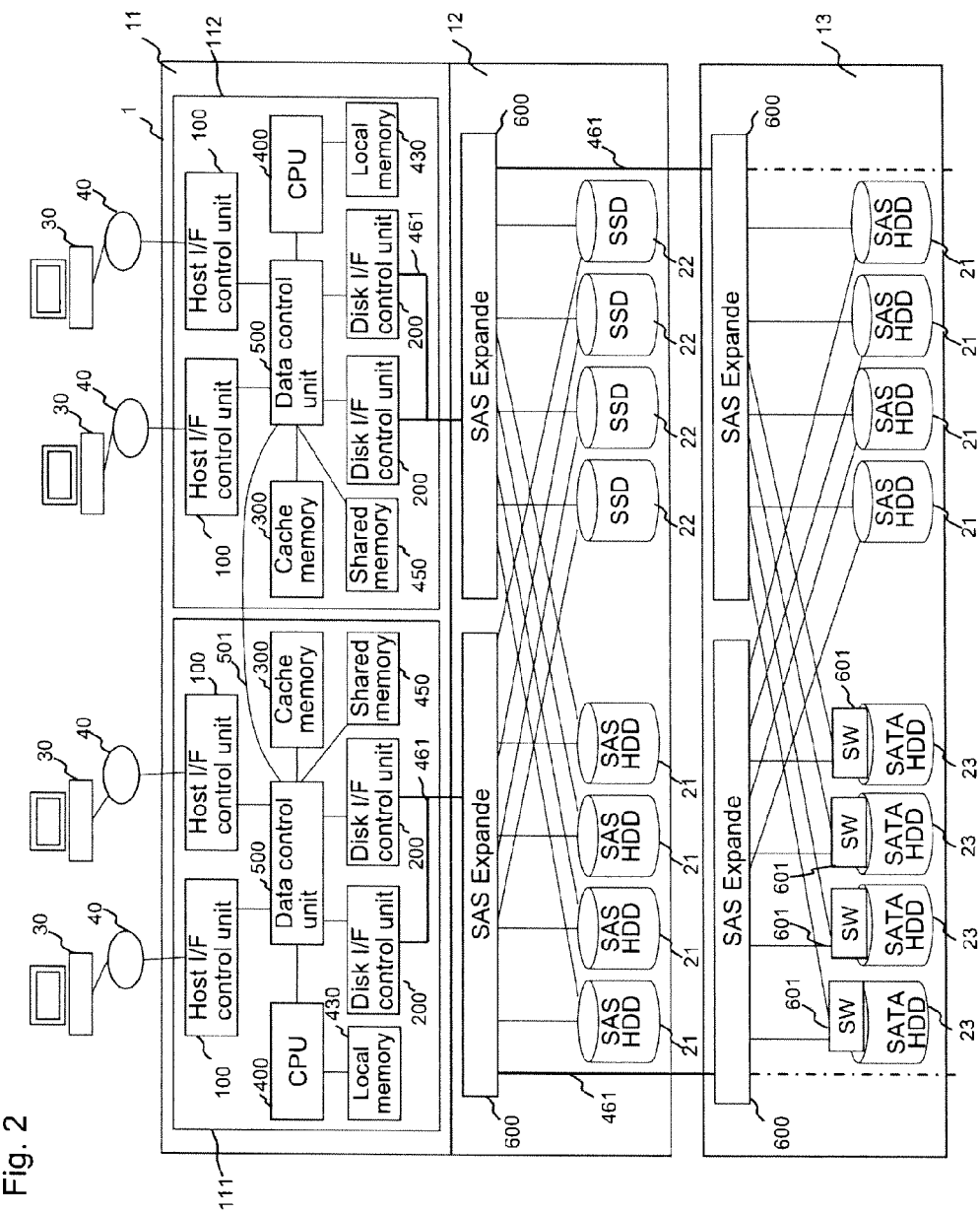
FIG. 2 is a view showing an internal configuration of the storage subsystem.

In the controller chassis 11 of the storage subsystem 1 illustrated in FIG. 2, a cluster structure is adopted in which the controller units having the same configuration constitute a pair and the controller units are coupled via a high speed bus 501. Further, the disk chassis 12 and the disk chassis 13 comprise SAS expanders 600 for expanding the number of interface ports for coupling with the HDD above the standard number, SAS HDD 21, SSD 22 and SATA HDD 23 which are coupled with the SAS expanders 600 in redundant configuration, and coupling lines 461 for coupling the disk chassis together or the controller chassis and the disk chassis.

As described, according to the storage subsystem 1, both controller units are capable of accessing the same HDDs. The configuration and operation of the controller unit 111 and the controller unit 112 in the storage subsystem 1 are the same. Therefore, the configuration and operation of only the controller unit 111 will be described in the present description, and the description of the controller unit 112 will be omitted.

The controller unit 111 is composed of host I/F control units 100 realizing access with the host computer 30, disk I/F control units 200 performing access with physical devices 20 (SAS HDD 21, SSD 22, SATA HDD 23 and the like) in the disk chassis 12 and 13, a cache memory 300 for temporarily storing data from the host computer 30 or the physical device 20, a CPU 400 for controlling the whole controller unit 111, a local memory 430 for storing programs executed via the CPU 400 and various control information, a shared memory 450 for storing control information and data to be shared among controller units, and a data control unit 500 for controlling the transmission of data among the above-mentioned components.

The host I/F control units 100 perform communication with the host computer 30 using a fiber channel protocol in a SAN (Storage Area Network) environment or an internet protocol such as an NFS (Network File System)/CIFS (Common Internet File System), so as to request input and output of data with respect to the host computer 30 and to transmit and receive data therewith.

The disk I/F control units 200 control transmission and reception of data with the physical devices storing data in the disk chassis 12 or the disk chassis 13. The cache memory 300 temporarily stores the data sent and received between the host I/F control unit 100 and the disk I/F control unit 200. For example, if the host I/F control unit 100 receives a data input request from the host computer 30, it transfers the data input request via the data control unit 500 to the CPU (Central Processing Unit) 400. The CPU 400 having detected the transmitted data input request orders the host I/F control unit 100 to start data transmission, and the data from the host I/F control unit 100 is stored in the cache memory 300 via the data transfer control 500.

The CPU 400 controls the host I/F control unit 100, the disk I/F control unit 200 and the data control unit 500 based on the control information from the host computer 30. The data control unit 500 is coupled to the host I/F control unit 100, the local memory 430 and the cache memory 300. The data control unit 500 controls the transmission and reception of control information (such as data input and output request) among the host I/F control unit 100 and the CPU 400 or among the disk I/F control units 200 and the CPU 400, and controls the transmission of data among the host I/F control units 100 and the cache memory 300 or among the disk I/F control units 200 and the cache memory 300.

Although not shown, the data control unit 500 is equipped with a function unit for performing a RAID parity operation for computing the RAID parity with respect to the data sent from the host computer 30 or for compressing and decompressing the data.

<Thin Provisioning Function>
<Concept of Thin Provisioning>

Figure 3A:
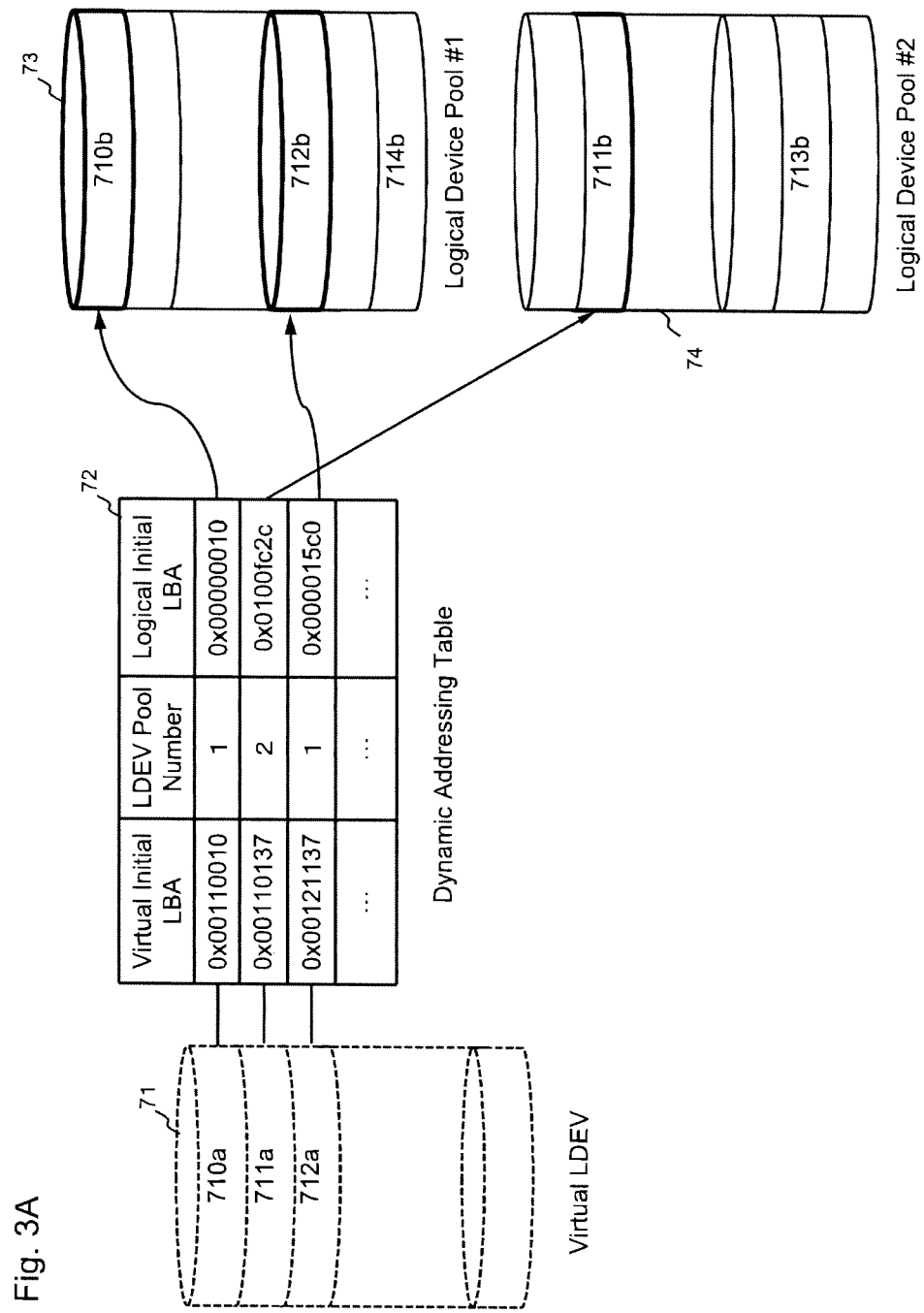
FIG. 3A is a conceptual diagram of the thin provisioning function.
Figure 3B:
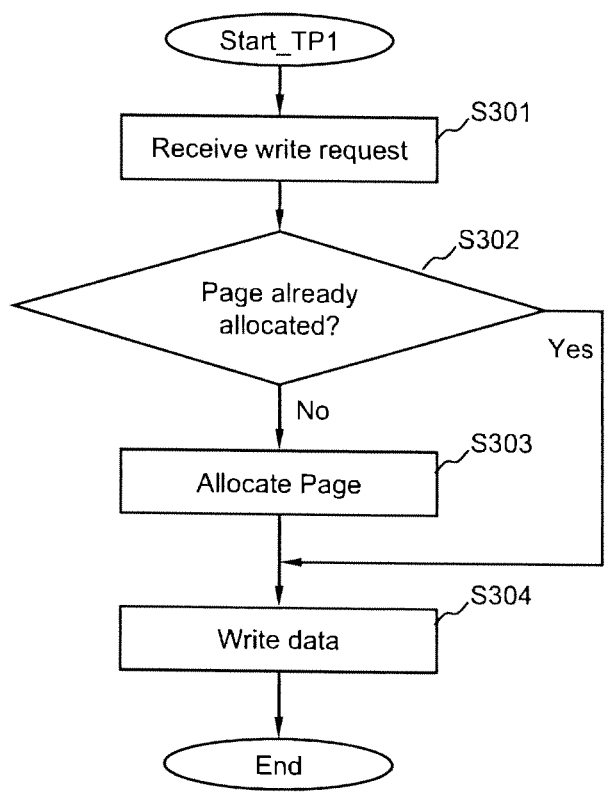
FIG. 3B is a flowchart showing a page allocation operation according to the thin provisioning function.
Figure 23:
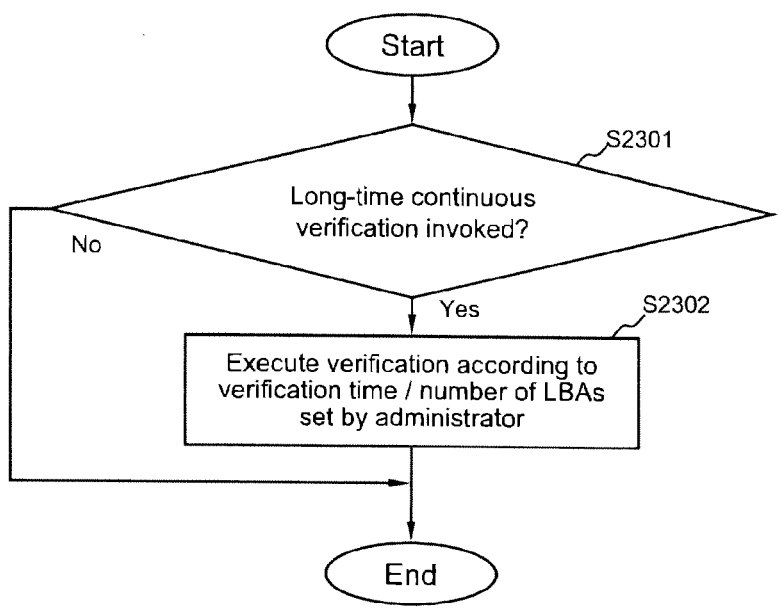
FIG. 23 is a flowchart for setting execution information when long-time continuous verification is invoked according to the present invention.
Figure 24:
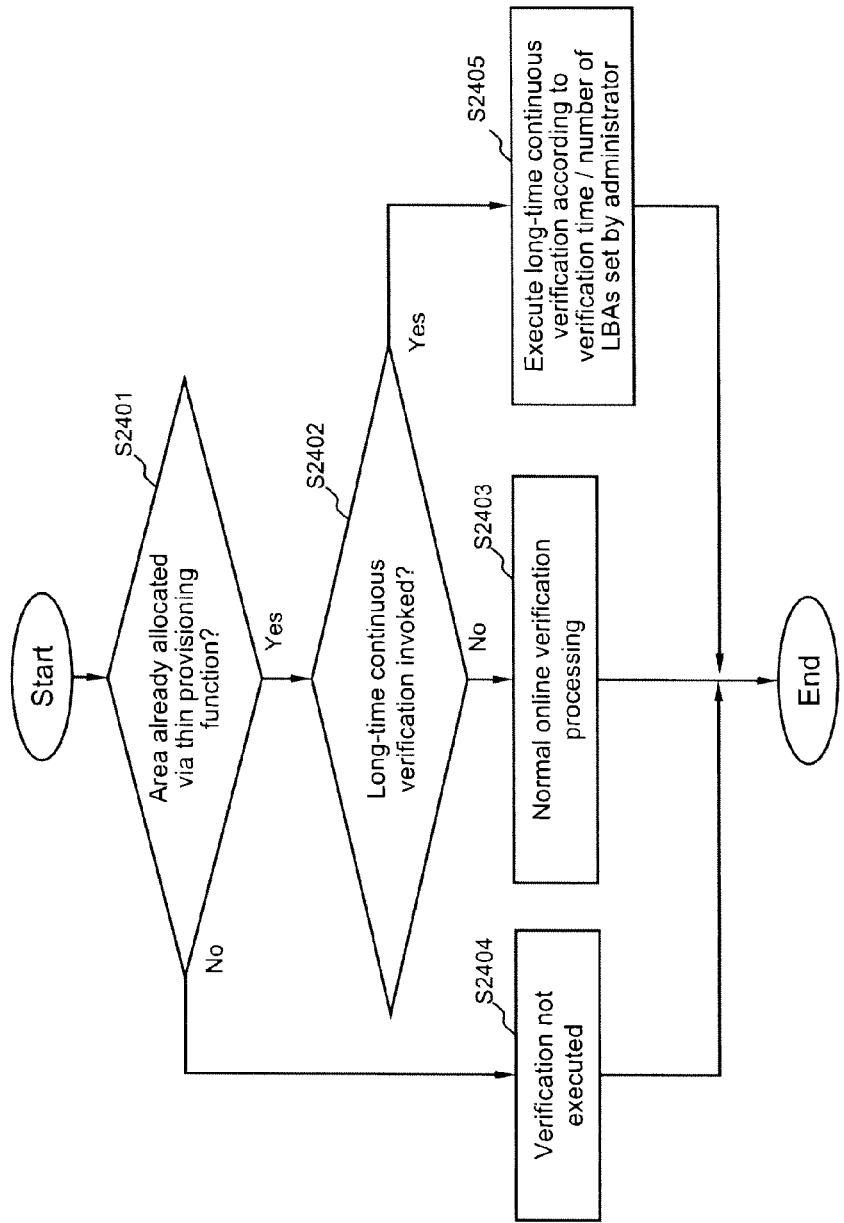
FIG. 24 is a flowchart of a hybrid verification processing having combined the verification inhibiting operation of the area unallocated to pages and long-time continuous verification according to the present invention.

Next, a method for dynamically allocating real storage areas will be described with reference to FIGS. 3A and 3B. FIG. 3A is a conceptual diagram of the dynamic real area allocation function called thin provisioning or dynamic provisioning. FIG. 3B is a flowchart showing the operation of the dynamic real area allocation function when data is written from the host computer to the virtual logical volume. A dynamic real area allocation function refers to a function for allocating a virtual logical volume having a capacity greater than the physical capacity to a host computer or the like and allocating necessary physical storage areas in response to a data write request. The method for determining whether to execute verification or not based on the allocation status of the real storage area will be described in detail later (FIGS. 23 and 24).

A virtual logical device (virtual LDEV) 71 which is a virtual logical volume that the host computer 30 accesses is composed of a plurality of virtual chunks (virtual areas) 710*a*, 711*a*, 712*a* and so on having predetermined fixed sizes (such as 1 megabyte (MB)). Each virtual chunk 710*a*, 711*a*, 712*a* and so on is composed of a given number of (for example, 64) logical blocks (each logical block having a size of 16 kilobytes (KB), for example). A single logical block or single virtual chunk corresponds to a virtual page.

Each virtual chunk 710*a*, 711*a* and 712*a* has a virtual initial logical block address (virtual initial LBA) which is the virtual LBA at the head of each virtual chunk, and the storage subsystem 1 is capable of specifying the virtual chunk based on the virtual initial LBA. Each logical device pool 73 or 74 is an assembly of one or more RAID groups, and composed for example of a plurality of logical chunks 710*b*, 711*b*, 712*b* and so on having a given size (1 MB, for example). Each logical chunk 710*b*, 711*b*, 712*b* and so on is composed of a given number of (64, for example) logical blocks (16 KB units). This logical block or logical chunk is called a "page" or a "real page", and an assembly composed of a plurality of pages is called a "pool" or a "logical device pool (LDEV pool)".

Each logical chunk 710*a*, 711*a* and 712*a* has a logical initial logical block address (logical initial LBA) which is a logical LBA at the head of each logical chunk, and the storage subsystem 1 is capable of specifying the logical chunk based on the logical initial LBA. When the logical initial LBA to be accessed is determined, the corresponding chunk number is determined. Actually, for example, if it is assumed that the logical chunk size is 1 MB (=64 blocks), the logical chunk number n is an integral part of a logical block number m/64. For example, the logical chunk number having logical blocks of logical block numbers 0 through 63 is zero, and the logical chunk number having logical blocks with logical block numbers 64 through 127 is one.

<Dynamic Addressing Table>

A dynamic addressing table 72 associates each virtual chunk 710*a*, 711*a*, 712*a* . . . of the virtual LDEV 71 with each logical chunk 710*b*, 711*b*, 712*b* . . . of each of the one or more LDEV pools 73 and 74. Actually, the information on each LDEV pool number and the logical initial LBA of the LDEV pool number corresponding to a virtual initial LBA is stored with respect to each virtual initial LBA. The dynamic addressing table 72 is stored in the shared memory 450. Each time the host computer 30 writes data to a virtual chunk that has not been allocated to a real storage area, the CPU 400 allocates a real storage area thereto and updates the dynamic addressing table 72.

<Operation of Thin Provisioning>

The actual operation of the function will be described with reference to FIG. 3B. At first, when a data write request is issued from the host computer 30, the storage subsystem 1 receives the write request (step S301). Next, the CPU 400 determines whether or not a page is already allocated to the virtual area (virtual chunk) being the target of the write request (step S302). If a page is already allocated (step S302: Yes), the CPU 400 writes the data from the host computer 30 to the allocated page. If the write capacity exceeds the allocated capacity, the CPU 400 allocates a new page (real area) and updates the dynamic addressing table 72.

For example, if the data write request is issued to the virtual area in which the virtual initial LBA starts from "x00110010" as shown in FIG. 3A, the CPU 400 determines based on the dynamic addressing table 72 that the virtual area has allocated thereto a page 710*b* of LDEV pool #1 starting with the initial logical LBA "x00000010" (having a storage capacity of 16 KB, for example) of LDEV pool number "1", and writes data to the page 710*b*.

If a page is unallocated (step 302: No), the CPU 400 allocates a new page from the LDEV pool. For example, if a data is written from the virtual area starting from the virtual initial LBA "x02000000", the CPU 400 determines that a page has not been allocated to the target virtual area based on the dynamic addressing table 72. Thus, the CPU 400 selects a free page (unused page) from the LDEV pools 73 and 74, and allocates a page to the virtual area. For example, in the case of FIG. 3A, a page 713*b* of LDEV pool #2 (having the logical initial LBA set to "0x01100010") is allocated. After allocating a page to the virtual area, the CPU 400 writes data into the allocated area. Then, the CPU 400 adds a new entry to the dynamic addressing table 72, and stores the write information related to the written data, wherein the virtual initial LBA is "x02000000", the LDEV pool number is "2" and the logical initial LBA is "0x01100010".

<Mapping Table of Logical Device and Physical Device>

Figure 4:
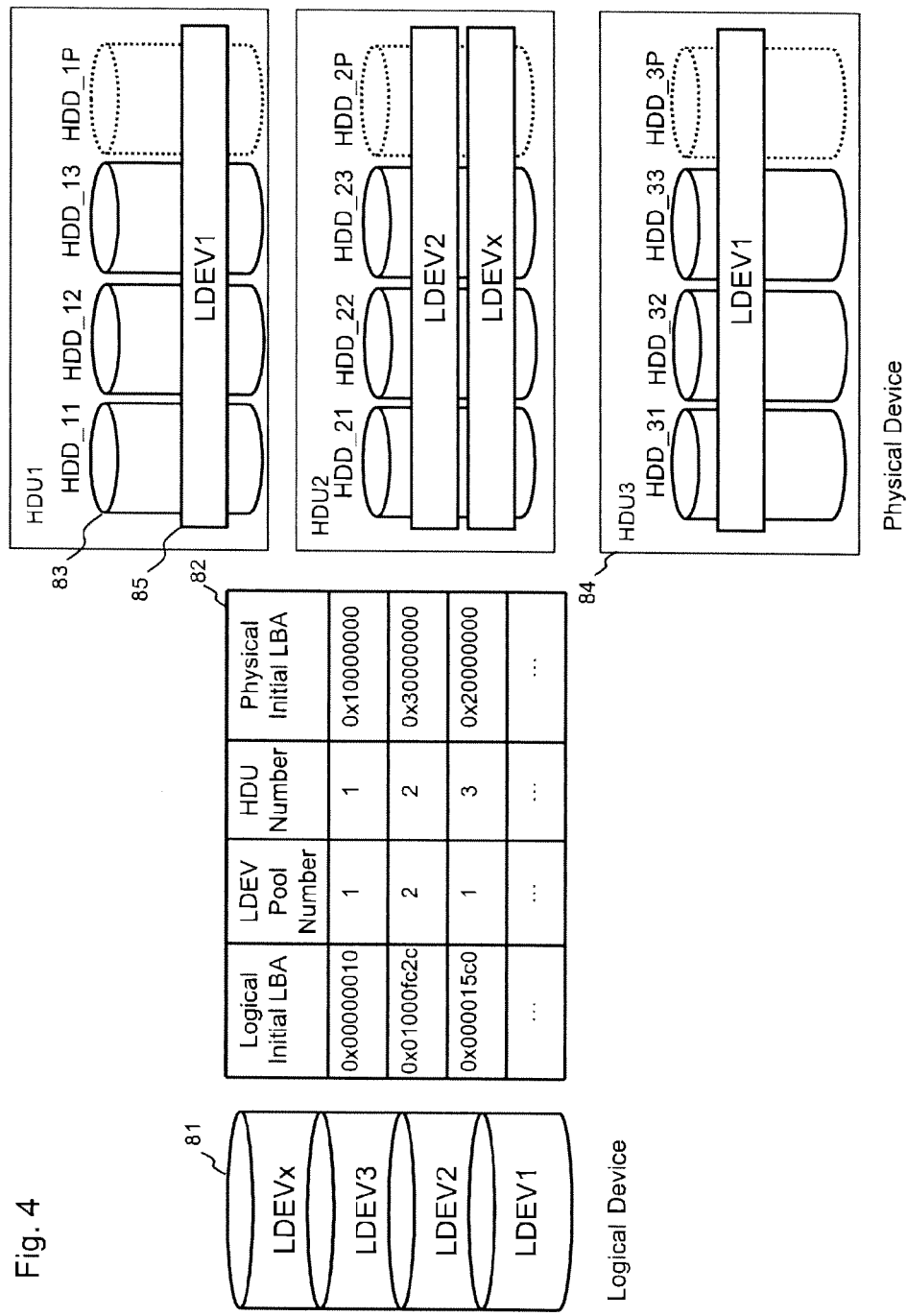
FIG. 4 is a view showing a correspondence between logical devices and physical devices.

Next, the correspondence between the logical device and physical device will be described with reference to FIG. 4. FIG. 4 is a view showing the correspondence between the LBA (logical block address) of the logical device and the physical device. As shown in FIG. 4, a logical initial LBA and an LDEV pool number are mapped to the logical device 81. Further, an HDU (HDD Unit) number and a physical initial address (physical initial LBA) which is the physical LBA at the head of each unit are mapped to the physical device.

The storage subsystem 1 manages the correspondence between the above information via a logical device—physical device management table 82. For example, a page 710*b* having a logical initial LBA "0x00000010" of LDEV #1 (LDEV number "1") 85 of FIG. 3A has the actual data written into HDU number "1" composed of four HDDs, HDD_11, 12, 13 and 1P (3D+1P; a RAID group of RAIDS is composed of three data disks and one parity disk), as shown in FIG. 4. Moreover, the data is stored in an area starting from the LBA in the HDD corresponding to the physical initial LBA of "0x10000000". LDEV #2, LDEV #3 through LDEV # X are similar to LDEV #1.

The logical device—physical device management table 82 is stored in a shared memory 450 or the like. Further, the physical initial LBA is the address of the HDD determined by observing the HDD from the exterior such as from the controller chassis 11, and differs from the address (LBA in sector units, track units and cylinder units) for specifying the data area storing the data within the HDD. However, the physical LBA and the LBA within the HDD has a one-to-one relationship within the HDD, and continuous LBAs within the HDD are associated with continuous physical LBAs. The present invention realizes an efficient verification also focusing on this point. However, the physical LBA and the LBA within the HDD is not required to be managed via one-to-one correspondence, as long as the correspondence thereof is managed.

<Outline of Verification>

<Prior Art Normal Online Verification>

Next, a normal online verification processing according to the prior art will be described. A controller unit 111 issues verification commands to respective HDDs for executing the verification processing simultaneously to a plurality of HDDs in the normal online verification processing. Therefore, a long time is required to complete verification of all areas of the HDD, and a long time is required for restoration when an error is detected.

Furthermore, during verification or restoration of errors, it is not possible to read data from or write data into a plurality of HDD groups (or LUs (Logical Units) composed of one or a plurality of LDEVs recognized as a single volume from the host computer 30) constituting a single data via a RAID configuration, so the processing affects the access performance of the host computer. In order to minimize the influence to the access performance, it is necessary to shorten the execution time of verification by detecting errors and restoring the same at an early stage via high speed execution of verification of the whole area of the HDD.

First, the normal online verification processing executed via the controller unit 111 will be described with reference to FIGS. 5A through 5C. According to the normal online verification, the controller unit 111 issues a verification command including the LBA information being the target of verification to each of the plurality of physical drives SAS HDD 21, SSD 22 and SATA HDD 23 in the drive chassis 12 and 13, and verification is executed based thereon.

Generally, an HDD has a defective area or a write incomplete area of the recording surface, and by verifying such area, errors can be detected via CRC (Cyclic Redundancy Check). Error processing (recovery and rewriting of data or execution of alternate track processing) is performed to the error LBA. The above describes the outline of the verification processing.

The actual processing will be described with reference to FIG. 5A. FIG. 5A is a flowchart illustrating a normal online verification processing. The normal online verification processing is periodically executed via the controller unit 111. Actually, the controller unit 111 grasps the state of execution of verification of the HDD (or the SSD) scheduled to be subjected to verification via the verification status management table 610 of FIG. 6. In other words, the controller unit 111 compares the maximum LBA 6108 of the verification status management table 610 and the verification final execution LBA 6109 to which verification has been last performed are compared, and determines whether verification has been executed to the maximum LBA (step S501).

If verification has been executed to the maximum LBA (step S501: Yes), the controller unit 111 sets the verification final execution LBA 6109 of the verification status management table 610 to "0" (step S505). If verification has not been executed to the maximum LBA (step S501: No), the controller unit 111 compares the current time and a verification final execution time 6110 when verification was last performed, and determines whether or not to execute verification (step S502).

If it is not the execution time (step S502: No), the controller unit 111 returns to the top of the normal online verification processing. If it is the execution time (step S502: Yes), the controller unit 111 executes step S503. In step S503, the controller unit 111 performs verification corresponding to a length of a predetermined number of LBAs from the sequel of the LBA having been subjected to previous normal online verification, that is, from the subsequent LBA after the verification final execution LBA 6109 in the verification status management table 610. If error is not detected via verification (step S504: No), the controller unit 111 returns to the top of the normal online verification processing flow. If error is detected (step S504: Yes), the controller unit 111 executes the error processing of step S506. After executing the error processing, the controller unit 111 returns to the top of the normal online verification processing flow.

In addition to the normal online verification mentioned above, according to the intelligent online verification of the present invention, online verification is executed to relevant sections, areas or within a period of time when:

(V1) an error occurs to a specific LBA of the HDD by a normal IO access (hereinafter referred to as IO access) from the host computer 30;

(V2) an area (LBA area) exists in which the access frequency is high or the access time is long; or (V3) a period of time exists during which the number of IO accesses is small.

Further, the disk I/F control unit 200 performs one or more of the following:

(M1) intensive verification of the circumference of the LBA where error has occurred;

(M2) area-based prioritized verification; and (M3) long-time continuous verification.

In addition, according to the aforementioned thin provisioning function, verification may or may not be executed to the area of the HDD corresponding to the page that is not assigned to the virtual area.

<Error Processing>
<Retry Processing>

If the defective area or the write incomplete area on the recording surface of the HDD is verified (or read), the error is detected via the CRC (Cyclic Redundancy Check). Depending on the level of the defect or the data write status, it is possible that the error is minor, and it may be possible to acquire the data (correct data) by performing a prescribed number of retry processes (retry operations).

The error recovery processing (step S506 of FIG. 5A) will be described with reference to FIGS. 5B and 5C. FIG. 5B is a flowchart illustrating the retry processing of the error detected via the online verification processing. Further, FIG. 5C is a flowchart showing the alternate processing of the error detected via the online verification processing. The error processing is executed by the controller unit 111 or the disk I/F control unit 200.

The retry processing S5060 is a process for determining whether an error-detected LBA can be used or not by retrying reading of data from the error-detected LBA, by writing restored data and reading the same. First, the disk I/F control unit 200 re-reads the error-detected LBA of the HDD where error has been detected (step S5061). The disk I/F control unit 200 determines whether CRC error occurs or not by the reading process (step S5062).

When error occurs (step S5062: Yes), the disk I/F control unit 200 determines whether or not the read process has been performed for a predetermined number of times (step S5063). If error has not occurred in step S5062 (step S5062: No), the disk I/F control unit 200 executes the process of step S5065 and subsequent steps.

If the read process has not been performed for a predetermined number of times (step S5063: No), the disk I/F control unit 200 repeats the processes from step S5061. If the read process has been performed for a predetermined number of times (step S5063: Yes), the disk I/F control unit 200 executes the data restoration processing of step S5064 and subsequent steps.

If data cannot be read correctly from the error-detected LBA after performing a predetermined number of read processes, the disk I/F control unit 200 restores the data of the error-detected HDD from an error-free HDD within the same LU (Logical Unit) (step S5064). According to this restoration method, for example, if error has been caused in the HDD_13 within HDU 1 composed of four HDDs as shown in FIG. 4 (a set of 3D+1P), an exclusive arithmetic processing of data among the other normal HDDs which are HDD__11, HDD__12 and HDD__1P, that is, two data HDDs and one parity HDD, is performed, and the data of the error-detected HDD__13 is restored (step S5064).

The disk I/F control unit 200 writes the restored data or the data read in step S5061 without causing error to the error-detected LBA of the error-detected HDD__13 (step S5065). Next, the disk I/F control unit 200 reads data from the error-detected LBA of the error-detected HDD__13 (step S5066).

Next, the disk I/F control unit 200 confirms that the data match or that CRC error is not caused (step S5067). If data inconsistency or CRC error occurs (step S5067: No), the disk I/F control unit 200 determines whether confirmation has been performed for a predetermined number of times or more in step S5068. If confirmation has not been performed for a predetermined number of times or more (step S5068: No), the disk I/F control unit 200 re-executes the processes of step S5065 and subsequent steps. If the disk I/F control unit 200 confirms data consistency or no occurrence of CRC error in step S5067, the error processing is ended and the procedure is returned to the normal online verification processing.

If the error status is not resolved after performing a predetermined number of confirmation or more (step S5068: Yes), the disk I/F control unit 200 performs the alternate track processing. The predetermined number of times can be once, twice or more times. The number can be determined in advance by the storage subsystem 1 or can be set later by the system administrator of the storage subsystem 1. The error processing of FIG. 5B (the process of determining whether the error-detected LBA is usable or not) combined the re-reading process (steps S5061 through S5063) and the reading and writing process of restored data (steps S5064 through S5068), but either one of the processes can be performed alone.

<Alternate Track Processing>

Next, the alternate track processing of FIG. 5C will be described. The alternate track processing is performed by the disk I/F control unit 200 when an uncorrectable fatal error as shown in FIG. 5B occurs. Further, the disk I/F control unit 200 can directly perform the present processing of FIG. 5C without performing the error processing S506 of FIG. 5A and the processing of FIG. 5B. At first, the disk I/F control unit 200 restores data by the method described in step S5064 of FIG. 5B. If the processing of FIG. 5C is performed continuously after the processing of FIG. 5B, step S5161 can be omitted.

Next, the disk I/F control unit 200 issues a reassignment command having added a physical LBA information to the error-detected HDD. The HDD having received the reassignment command allocates an alternate area (alternate track) to the internal error area, and reassigns the internal error LBA information to the address information of the alternate area (alternate track). Thereafter, the HDD closes the error area of the error LBA as a defective area (step S5162).

Lastly, the data restored in step S5161 is written to the HDD where error has occurred (step S5163), and the alternate sector processing is ended to return to the normal online verification processing. The alternate track processing is performed only within the HDD, and there will not occur any change of LBA information or the like from the disk I/F control unit 200 to the HDD. Moreover, when an HDD having not only a CRC function but also an ECC (Error Correcting Code) function is used, error detection and correction is enabled, so that not only the reassignment of address within the HDD but also the migration of stored data is enabled. Efficient verification can be executed by varying the above-mentioned contents of error processing according to the state of progress of verification based on the verification status management table 610 of FIG. 6, or according to the IO access status based on an area-based IO access frequency table 1201, an area-based IO access time table 1202 of FIG. 12 or a period-of-time-based IO access frequency table 1501 of FIG. 15 mentioned later.

<Verification Status Management Table>

Next, an online verification status management table (hereinafter referred to as verification status management table) 610 for managing the control information used for executing the verification processing according to the present invention will be described in detail with reference to FIG. 6. The verification status management table 610 includes as basic information a chassis number—slot number 6101, a manufacturer 6102 of each HDD and SSD, a model name 6103, and a serial number 6104. Further, the table includes as specific information a type 6105 of each HDD or SSD, a storage capacity (TB) 6106, a rotation frequency 6107, and a maximum LBA 6108. The table also includes as verification execution status management information a last LBA subjected to verification (hereinafter referred to as last verified LBA) 6109, a last verified LBA time which is the final time of execution of verification (hereinafter referred to as last verification time) 6110, an initial LBA 6111 and an end LBA 6112 when verification is resumed. For example, it can be recognized from the verification status management table 610 that a target having a chassis number—slot number 6101 of "0-10" is an SAS type HDD with a capacity of 1 TB, and the maximum LBA thereof is "MM1". Further, the last verified LBA is "CC10" and the last verification time is "10:10". The LBA to be subjected to verification during the next verification starts from "SL10" and ends at "EL10".

<Intensive Verification of Circumference of Error-detected LBA>

<Concept of Intensive Verification of Circumference of Error-detected LBA>

Next, the method for performing intensive verification of the circumference of the error-detected LBA (hereinafter abbreviated as intensive verification of circumference of error LBA or simply intensive verification) according to an embodiment of the intelligent online verification processing according to the present invention will be described with reference to FIGS. 7 through 10. There is a possibility that undetected errors exist in the circumference of the error-detected LBA due to defects caused during fabrication, damages caused by head contact during use or temporary write failure. In addition, there is a high possibility that the host computer accesses the LBA in the circumference of the error-detected section. Therefore, the present invention performs online verification called an intensive verification of circumference of the error-detected LBA according to an embodiment of the present invention to the area where such undetected error may exist, in order to detect errors in advance at an early stage and to restore the same. The intensive verification of the circumference of the error LBA aims at enhancing the reliability and access performance with respect to data processing of the host computer. The outline of the process will be described with reference to FIG. 9.

Figure 9:
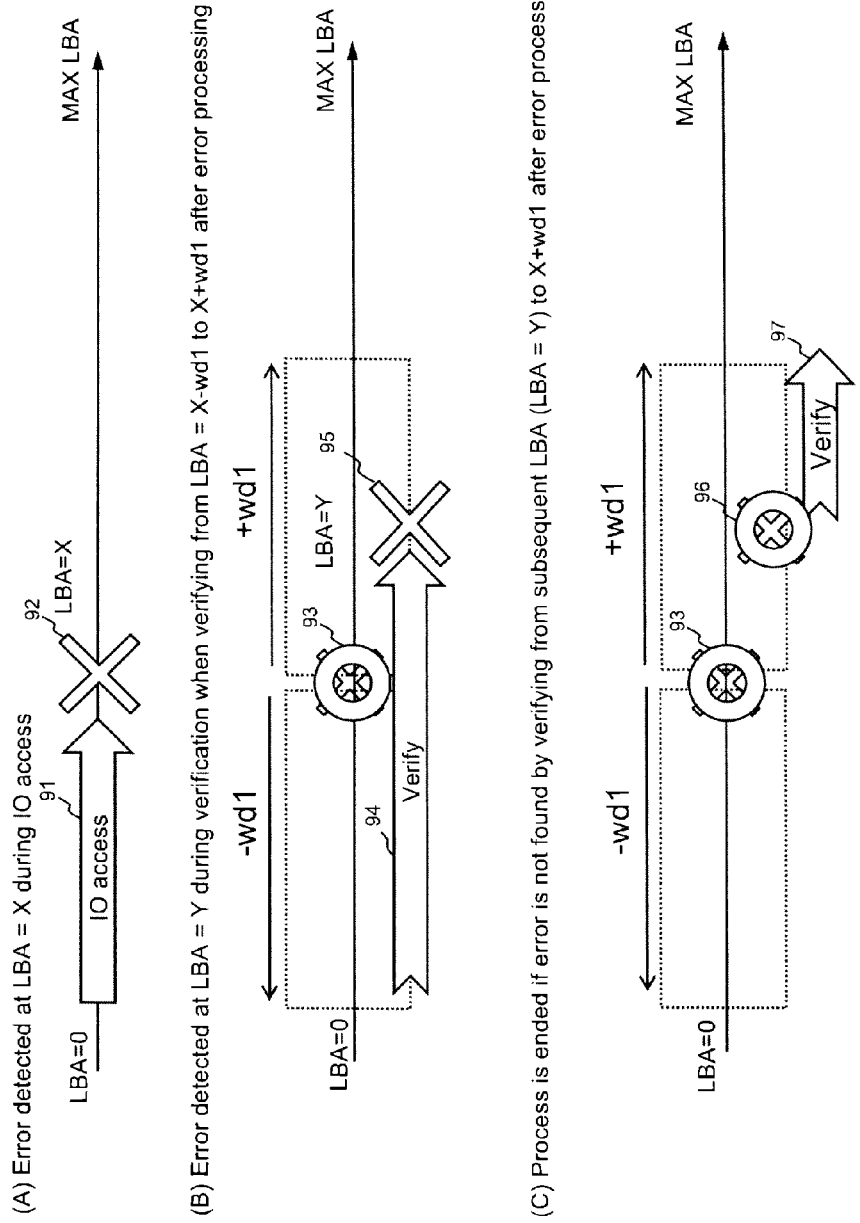
FIG. 9 is a view showing the intensive verification processing performed to the circumference of the error-detected LBA according to the present invention.

First, the concept of intensive verification of the circumference of the error-detected LBA will be described with reference to FIGS. 9 and 10. FIG. 9 is a frame format showing the operation of intensive verification of the circumference of the error-detected LBA. An IO access 91 (such as a read access) is issued from the host computer 30 to the storage subsystem 1. The IO access 91 is sent via the host I/F control unit 100 and via the disk I/F control unit 200 to the physical device 20. A CRC error occurs during the process of reading the error LBA section 92 (LBA=X) via this IO access (FIG. 9(A)).

Figure 5A:
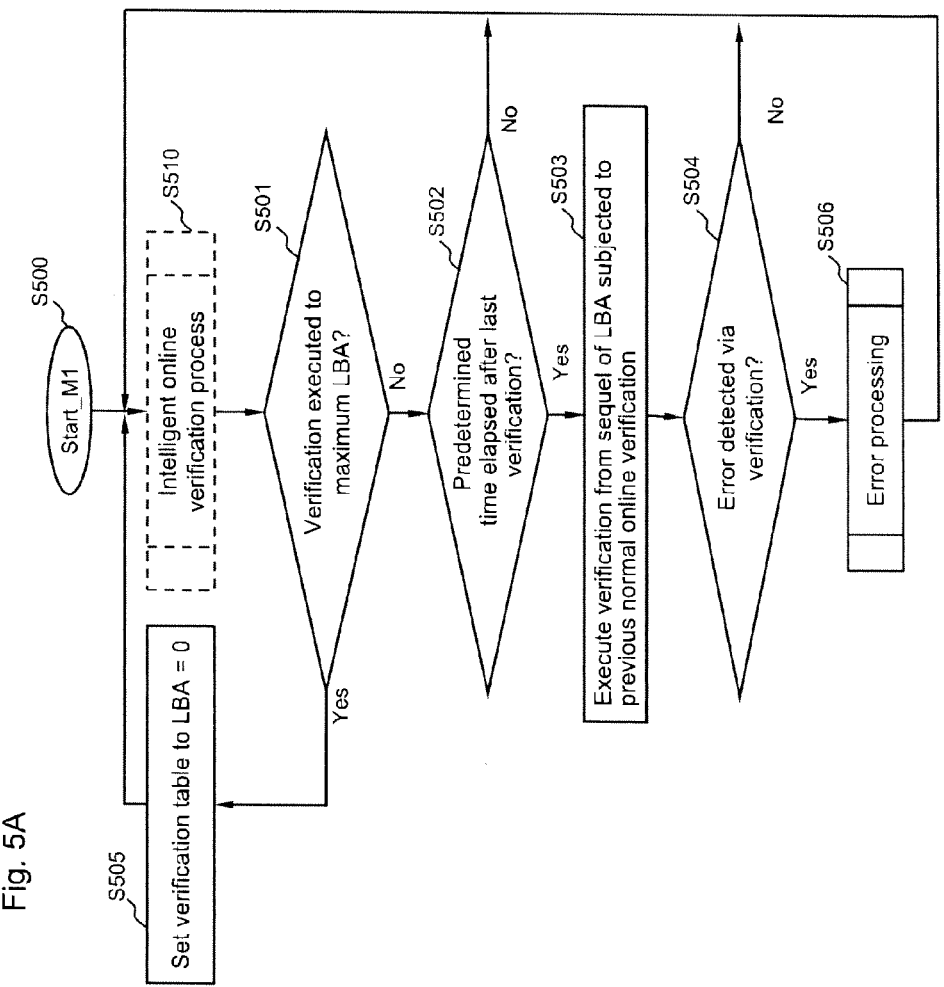
FIG. 5A is a flowchart showing the overall operation of online verification processing.
Figure 5B:
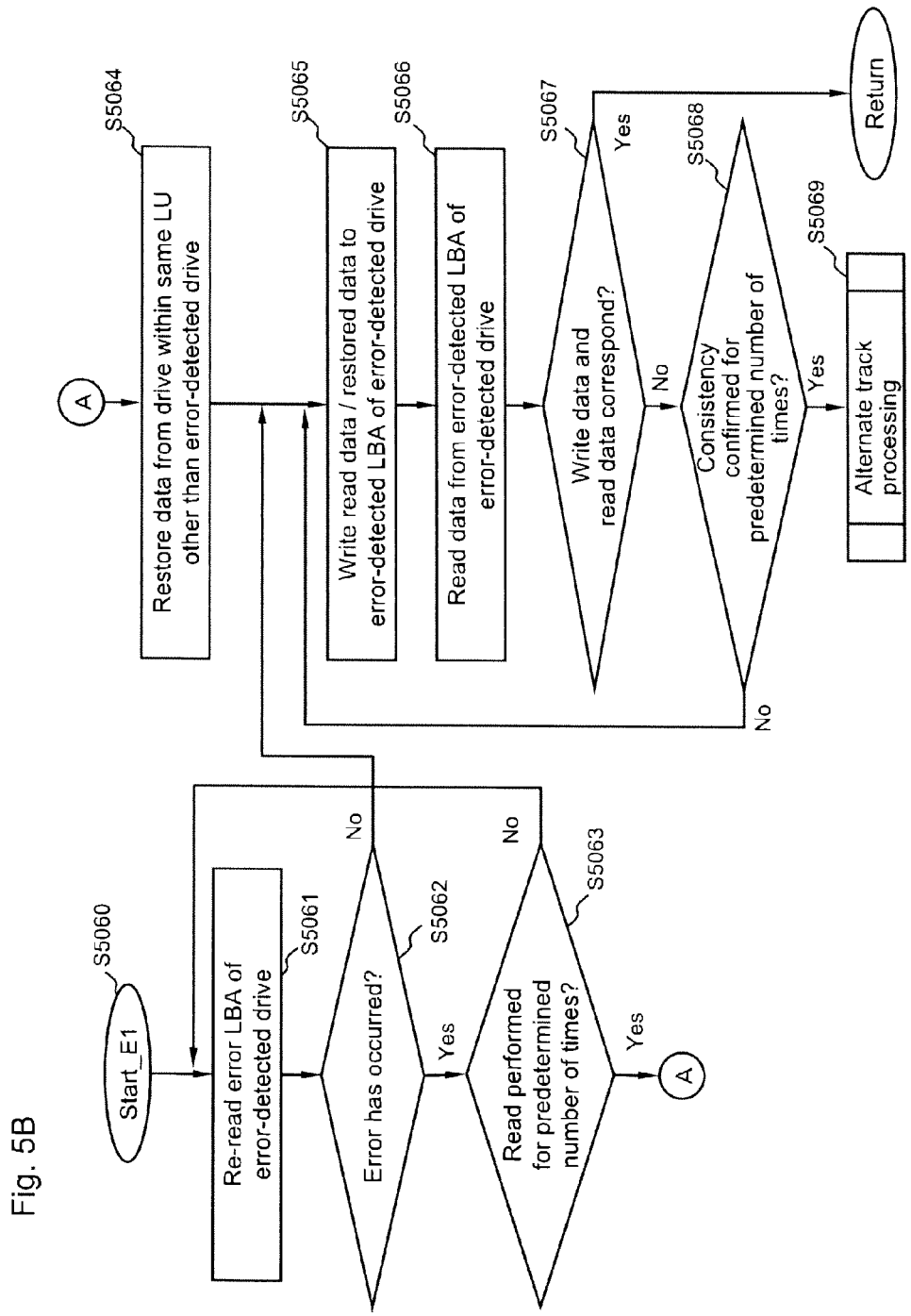
FIG. 5B is a flowchart showing a retry processing performed during error processing.
Figure 5C:
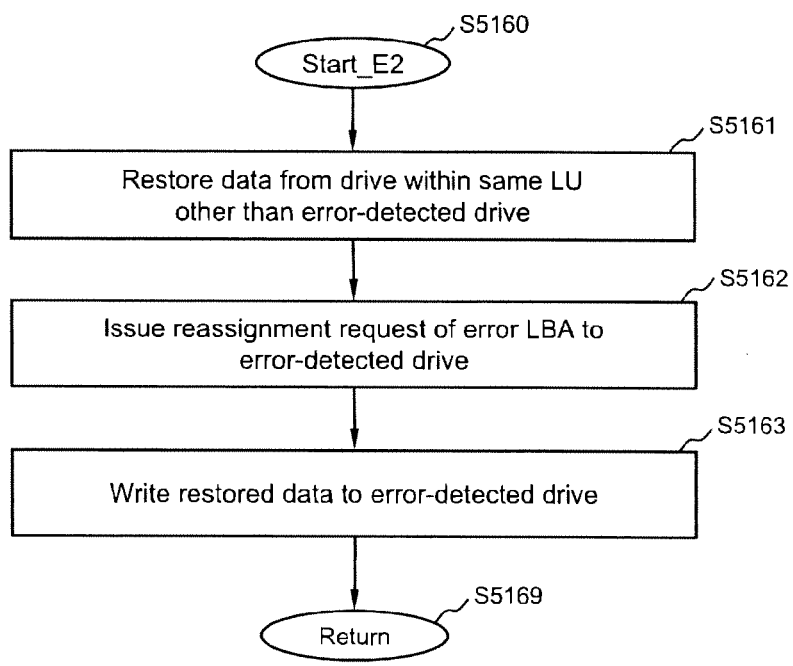
FIG. 5C is a flowchart showing an alternate track processing performed during error processing.

The disk I/F control unit 200 executes an error processing S506 shown in FIG. 5A and restores the error (reference number 93) of the error-detected LBA. Thereafter, the intensive verification of the circumference of the error-detected LBA according to the present embodiment is implemented and the process is executed. According to the prior art method, verification is not successively executed after restoring the error-detected LBA. Therefore, according to the prior art, an error possibly occurs again by the next or subsequent IO access, affecting the access performance.

Thus, the present invention performs verification intensively of the circumference of the error-detected LBA. In order to detect the hidden errors at the circumference of the error-detected LBA, the disk I/F control unit 200 executes verification 94 of the front and rear areas of the error-detected section, that is, from LBA=X−wd1 to LBA=X+wd1. For example, if a hidden error LBA section 95 exists, the disk I/F control unit 200 can detect the error and perform restoration thereof through verification 94 (FIG. 9(B)). After restoring the error LBA section 95 (reference number 96), the disk hF control unit 200 resumes verification 97 from the restored section 96 (FIG. 9(C)). If error occurs frequently, the verification processing can be switched from FIG. 9 to FIG. 10 in order to enhance data reliability.

Figure 10:
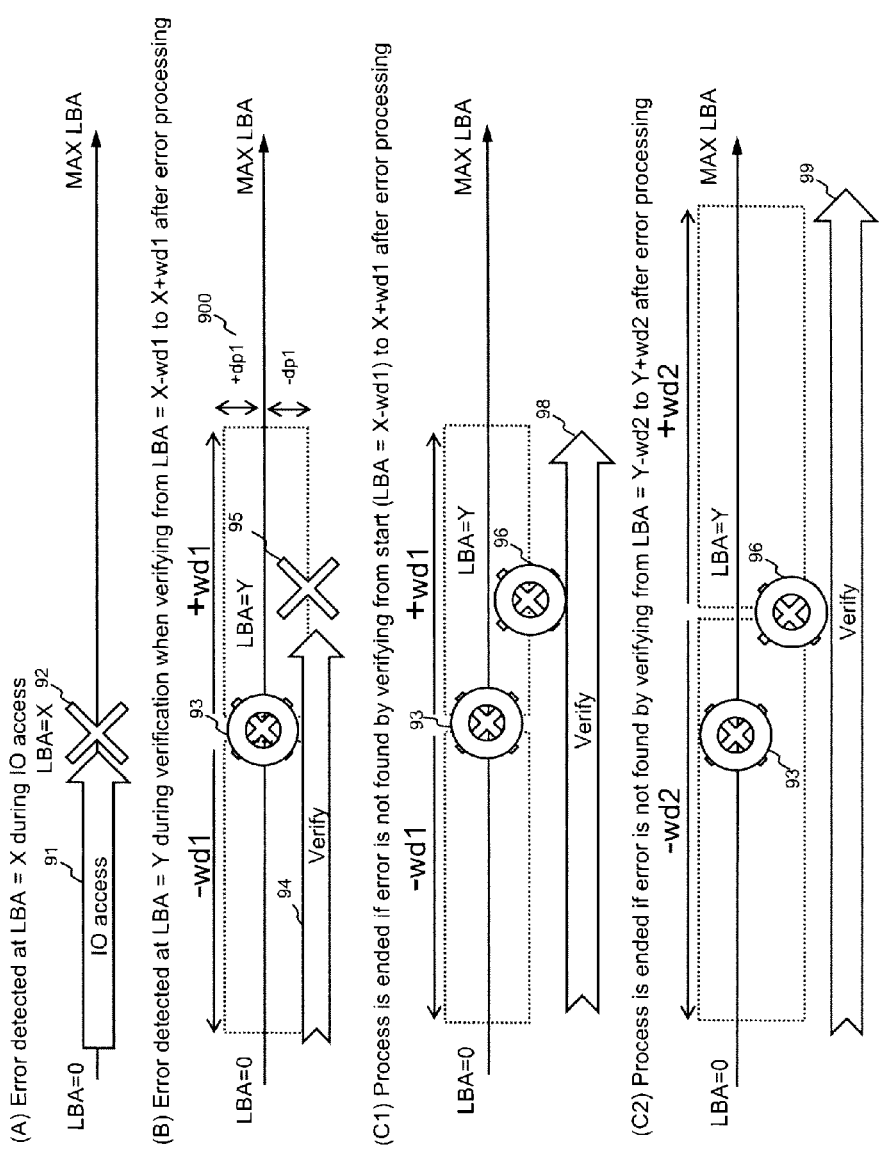
FIG. 10 is a view showing the intensive verification processing performed to the circumference of the error-detected LBA according to the present invention.

FIG. 10 is a verification method having further improved the failure detection accuracy, wherein after performing the error processing for the second or more times, the verification 98 is performed again to the range from LBA=X−wd1 to LBA=X+wd1. After performing the second error processing, the verification 97 is not resumed from the second error detection section 96 as shown in FIG. 9(B) but the verification 97 is executed from the initial verification initial LBA, that is, LBA=X−wd1. Furthermore, as shown in FIG. 10(C2), the width of the range can be set to wd2 (wd2>wd1), and verification 99 can be executed to the area from LBA=X−wd2 to LBA=X+wd2. Further, the aforementioned verification is executed to a continuous area (the HDD media is verified spirally). It is possible to perform verification to a two-dimensional area, the anterior and posterior area of the error section from −wd1 to +wd1 and the upper and lower area of the error section from −dp1 to +dp1 (reference number 900 of FIG. 9(B)).

<Method for Determining Range of Verification>

The value wd1 determining the range for executing verification can be selected arbitrarily by an administrator or the like by considering the access performance or the total verification time by the storage subsystem or the physical device, such as the following:

(L1) constant value predetermined via the storage subsystem 1;
(L2) value allocated based on the type of HDD or SDD;
(L3) value designated by the system administrator;
(L4) variable value via TOV (Time Out of Verification) of the system;
(L5) variable value via TOV of the HDD or SSD;
(L6) variable value based on error type; or
(L7) variable value based on the capacity of HDD or SSD.

Further, wd2 and dp1 can be determined similarly. As a modified example, the range for executing intensive verification anterior and posterior to the error detected section can be varied between the anterior section and the posterior section of the error detected section. That is, the range can be set from LBA=X−wd3 to LBA=X+wd4 (wd3 is not equal to wd4).

<Operation of Intensive Verification of Circumference of Error-Detected LBA>

Figure 7:
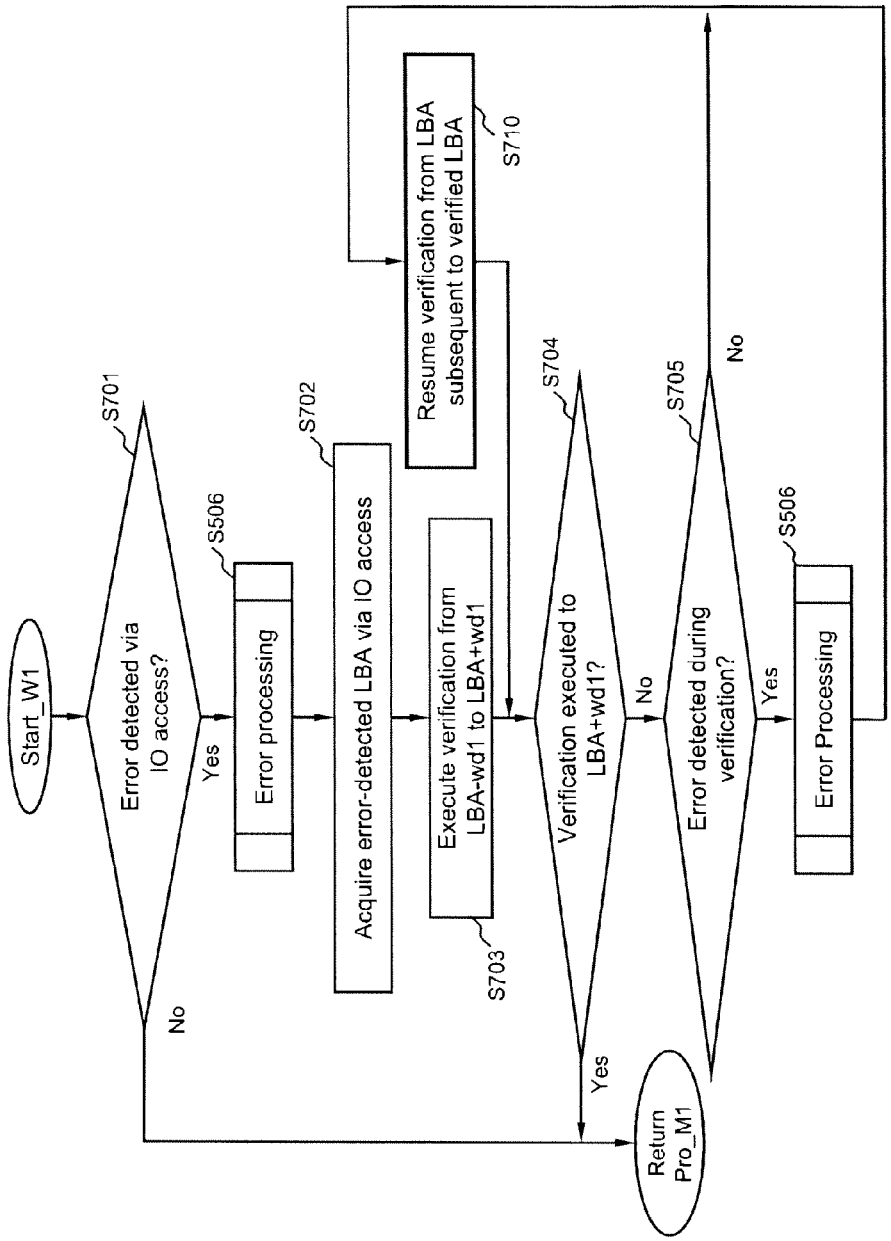
FIG. 7 is a flowchart of an intensive verification processing performed to a circumference of an error-detected LBA according to the present invention.

Next, the actual operation of intensive verification of the circumference of the error-detected LBA according to FIG. 9 will be described with reference to FIG. 7. At first, the disk I/F control unit 200 determines whether HDD error has been detected or not in the IO access to the storage subsystem 1 from the host computer 30 (step S701). If HDD error has not occurred (step S701: No), the disk I/F control unit 200 ends the intensive verification processing of the circumference of the error-detected LBA and returns to the normal online verification processing.

On the other hand, if error has occurred (step S701: Yes), the disk I/F control unit 200 executes an error processing (FIG. 5B or 5C) (step S506). After the error processing, the disk I/F control unit 200 acquires the LBA information of the error-detected HDD during IO access (step S702). Next, the disk I/F control unit 200 executes verification of the range anterior and posterior to the error LBA (from LBA−wd1 to LBA+wd1) (step S703). Next, the disk I/F control unit 200 determines whether verification has been performed or not to the last LBA+wd1 to be subjected to verification (step S704).

If verification has been executed to the last LBA+wd1 (step S704: Yes), the disk I/F control unit 200 ends the verification processing of the circumference of the error LBA, and returns to the normal online verification processing. If verification has not yet been executed (step S704: No), the disk I/F control unit 200 determines whether error has been detected or not (step S705). If error has been detected (step S705: Yes), the disk I/F control unit 200 executes an error processing (step S506), and resumes verification from the subsequent LBA of the last verified LBA (verified LBA) (step S710). Then, the disk I/F control unit 200 executes verification of the final LBA+wd1 to be verified (step S704: Yes), and returns to the normal online verification processing.

Figure 8:
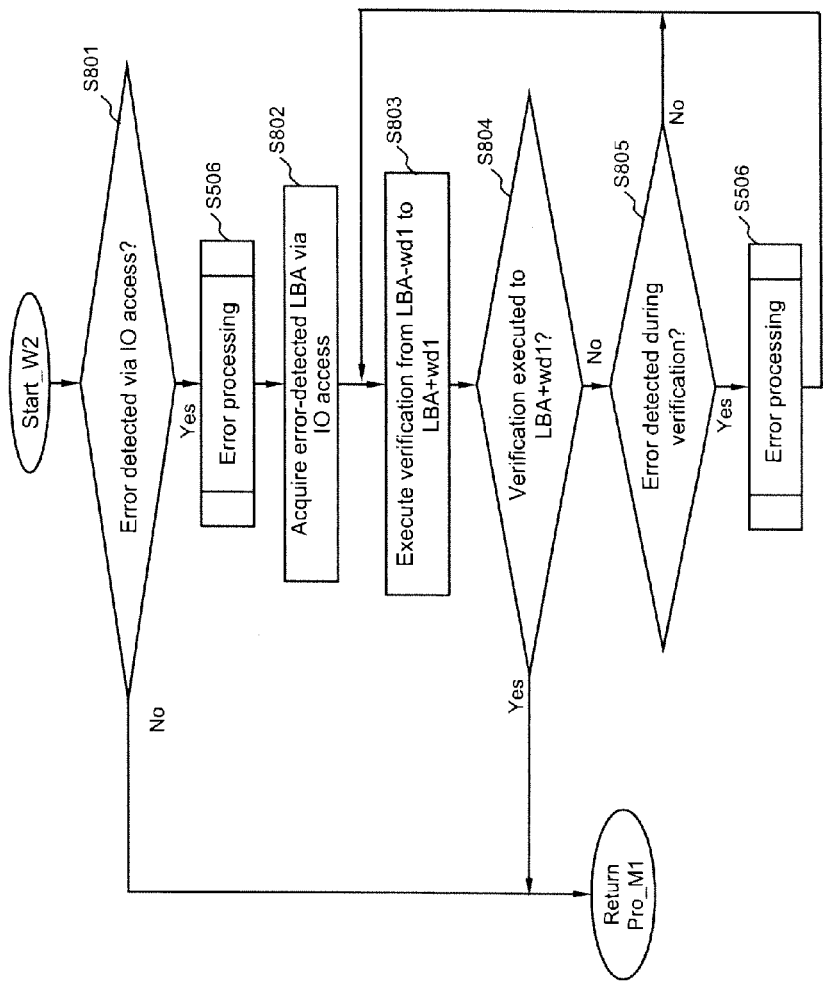
FIG. 8 is a flowchart of an intensive verification processing performed to a circumference of an error-detected LBA according to the present invention.

Next, the actual operation of the intensive verification processing of the circumference of the error-detected LBA according to FIG. 10 will be described with reference to FIG. 8. At first, the disk I/F control unit 200 determines whether error has been detected or not in the IO access to the storage subsystem 1 from the host computer 30 (step S801). If HDD error has not occurred (step S801: No), the disk I/F control unit 200 ends the intensive verification processing of the circumference of the error LBA and returns to the normal online verification processing.

On the other hand, if error has occurred (step S801: Yes), the disk I/F control unit 200 executes an error processing (FIG. 5B or 5C) (step S506). After the error processing, the disk I/F control unit 200 acquires the LBA information of the error-detected HDD during IO access (step S802). Next, the disk I/F control unit 200 executes verification of a range anterior and posterior to the error LBA (from LBA−wd1 to LBA+wd1) (step S803). Next, the disk I/F control unit 200 determines whether verification has been performed or not to the last LBA+wd1 to be subjected to verification (step S804).

If verification has been executed to the last LBA+wd1 (step S804: Yes), the disk I/F control unit 200 ends the verification processing of the circumference of the error LBA, and returns to the normal online verification processing. If verification has not yet been executed (step S804: No), the disk I/F control unit 200 determines whether error has been detected or not (step S805). If error has been detected (step S805: Yes), the disk I/F control unit 200 executes an error processing (step S506), and executes the processes from step S803 again. Then, the disk I/F control unit 200 executes verification to the final LBA+wd1 to be verified (step S804: Yes), and returns to the normal online verification processing.

As described, the present embodiment enables to detect in advance and restore the undetected error section hidden near the error-detected LBA, so that the reliability of data processing and the access performance of the host computer can be enhanced. Further, if there is a large number of error sections found in the verification processing of FIG. 9, it is possible to switch the processing to that illustrated in FIG. 10 to further enhance the reliability of the processing.

<Verification of High IO Access Frequency Area>
<Measurement of IO Access Frequency>

Next, we will describe the method for executing verification of the area where IO accesses occur highly frequently. The verification is executed by dividing the area into LU units or storage module (HDD or SSD) units to perform measurement and management of the IO access frequency of each area, selecting an area having a high access frequency based on the measurement information, and prioritizing the execution of verification of the selected area.

This method enables to perform prioritized online verification to a frequently accessed area to detect undetected error sections at an early stage, thereby enhancing the reliability of data stored in the storage subsystem 1. In addition, the present invention minimizes the retry performed to the HDD (repeated read or write access) caused by error during IO access, and enhances the performance of access from the host computer 30 to the storage subsystem 1.

<Method for Determining IO Access Measurement Area>

At first, we will describe the method for determining the area to be subjected to verification. Four typical methods for determining the area are shown below.

(AR1) LU Units

According to this method, at first, an area number is allocated to each LU unit, and the number of IO accesses of each LU unit is counted to calculate the access frequency. According to the result of calculation, the LU having a high IO access frequency is specified. The advantageous point of this method is that the measurement of the area being accessed can be performed easily.

(AR2) Equally Dividing the Total Capacity of Drives

According to this method, at first, the total capacity of respective HDD or SDD drives (total capacity 6106 of FIG. 6) is equally divided by an arbitrary value (div1), and the number of accesses performed to each divided area is counted to calculate the access frequency. Then, based on the calculated result, the area having a high IO access frequency is specified. The advantageous point of this method is that the size of the area can be varied flexibly based for example on the performance of the HDD as physical device.

(AR3) LBA Units

According to this method, at first, a minimum LBA (such as sector units) of each HDD or SSD drive is assumed as a single area and the number of accesses performed thereto is counted to calculate the access frequency. Then, based on the calculated result, the LBA having a high IO access frequency is specified. The advantageous point of this method is similar to (AR2) in that the size of the area can be varied flexibly based for example on the performance of the HDD as physical device.

(AR4) Circumference of LBA Unit

According to this method, at first, the range from LBA−wd1 to LBA+wd1 where the respective HDD or SSD drive has been accessed is managed as a single area, and the number of accesses performed thereto is counted to calculate the access frequency. Then, based on the calculated result, the LBA range having a high access IO frequency is specified. The overlapped portions of each area range is set to the area having a higher IO access frequency. The advantageous point of this method is similar to (AR2) and (AR3) in that the size of the area can be varied flexibly based for example on the performance of the HDD as physical device.

<Area-Based IO Access Frequency Table>

Next, we will describe an area-based IO access frequency table with reference to FIG. 12. The area-based IO access frequency table 1201 or the area-based IO access time table 1202 is a table for managing the number of accesses and the access time of each area by measuring IO accesses of each divided area. The area-based IO access frequency table 1201 is composed of an access number, an area number, and an IO access count (hereinafter referred to as count), and the area-based IO access time table 1202 includes the IO access time instead of the IO access count.

An access number is a serial number for identifying the order in which access has occurred to the area, and the smaller number means that the area has been accessed more recently. The disk I/F control unit 200 monitoring access stores information of the area to which access has occurred most recently to the field where the access number is "1", and stores a previous access information to the field where the access number is "2". The unit stores information in a similar manner to the fields where the access numbers is "3", "4" and so on.

An area number is a number assigned to each area, and a corresponding count field stores the number of times of accesses having occurred to that area. According to the operation, when an access occurs to a certain area, all area numbers in the area-based IO access frequency table 1201 is searched, and when a corresponding number is not found, the stored access numbers of the arrays are all incremented (+1), and the columns are shifted to the right. Then, the information of the area number to which access has occurred is stored in the area number where the access number is "1", and the count value is set to "1". When an existing row is moved to the right, the area number and the count value thereof having exceeded the access number positioned at the right end area (maximum value set in advance, which in the case of FIG. 12 is 5) are deleted. The delete processing is executed to reduce the number of management steps for a significant number of areas and for reducing the storage capacity of management information thereof.

If the area number to which access has occurred exists in the area-based IO access frequency table 1201, the existing rows are moved to the right and the area number of the area to which access has occurred and the incremented count value is stored in the field of access number "1". The actual operation of the table update processing is as follows.

(a1) IO access occurs to area number "1500"

The disk I/F control unit 200 searches the area-based IO access frequency table 1201 and finds that there is no area number "1500", so it enters "1500" to the area number of access number "1" and enters "1" to the count in the area-based IO access frequency table 1201.

(a2) IO access occurs to area number "2000"

The disk I/F control unit 200 searches the area-based IO access frequency table 1201 and finds that there is no area number "2000", so it moves the information of area number "1500" and count "1" having an access number "1" to the area number field and the count field of access number "2". After moving the information, the disk I/F control unit 200 enters area number "2000" and count "1" information to access number "1" of the area-based IO access frequency table 1201.

(a3) IO access occurs to area numbers "5000", "6000" and "7000" in named order

The operations of (a1) and (a2) are repeatedly performed for area numbers "5000", "6000" and "7000". As a result, information related to five access numbers are stored in the area-based IO access frequency table 1201 and the table is filled.

(a4) Second IO access occurs to area number "1500"

The disk I/F control unit 200 searches the area-based IO access frequency table 1201 and finds the area number "1500" in access number "5" (right end of the table), so in order to enter "1500" to the area number of access number "1" and to enter an incremented number "2" to the count, the existing rows are moved to the right and the information related to area number "1500" is stored in the row of access number "In this case, the disk I/F control unit 200 does not execute the delete processing.

(a5) IO access occurs to area number "9000"

The disk I/F control unit 200 searches the area-based IO access frequency table 1201 and finds that there is no area number "9000", so it deletes the area number "2000" and the count "1" stored in the access number "5" at the right end of the table to enter area number "9000" and count "1" to access number "1". After deleting the relevant information, the disk I/F control unit 200 moves the rows of the area-based IO access frequency table 1201 to the right and stores area number "9000" and count "1" to the freed access number "1".

As described, the disk I/F control unit 200 updates the area-based IO access frequency table 1201 every time an IO access occurs to each area. Further, as shown in FIG. 12(b1), it is possible to store the access time (min) instead of the count value of the number of accesses to manage the IO access frequency in an area-based IO access time table 1202. By adopting the above-mentioned method for measuring the access frequency, it becomes possible to measure the access frequency via a small management data capacity compared to measuring the access frequencies of all the LBA. The area-based IO access frequency table 1201 and the area-based IO access time table 1202 can be stored in a storage means in the interior of the disk I/F control unit 200 or the shared memory 450. The contents of the area-based IO access frequency table 1201 and the area-based IO access time table 1202 are cleared when verification of all the areas having high access frequency or the like is completed, and the measurement of access frequency is started again.

<Verification Operation of Area Having High IO Access Frequency>

Next, a process for prioritizing verification of the area having a high access frequency out of divided areas will be described with reference to FIG. 11. The present process is performed periodically by the disk I/F control unit 200 independently from the normal online verification processing. First, the disk I/F control unit 200 refers to the area-based IO access frequency table 1201 and determines whether the access frequency of each area has exceeded a threshold (AC_th1) or not (step S1101).

If the access frequency of each area has not exceeded the threshold (AC_th1) (step S1101: No), the disk I/F control unit 200 ends the prioritized verification processing of the high access area and returns to the normal online verification processing. On the other hand, if the access frequency of each area has exceeded the threshold (AC_th1) (step S1101: Yes), the disk I/F control unit 200 refers to the dynamic addressing table 72 or the logical device—physical device management table 82 to obtain the range of the LBA corresponding to the area having exceeded the threshold, and executes verification of the range of the LBA corresponding to the area having exceeded the threshold (step S1102).

Thereafter, the disk I/F control unit 200 determines whether verification has been executed to all areas having exceeded the threshold (step S1103). If all the areas have not yet been verified (step S1103: No), the disk I/F control unit 200 determines whether an error has been detected or not during verification (step S1104). If an error has occurred (step S1104: Yes), the disk I/F control unit 200 executes an error processing (step S506). If an error has not occurred (step S1104: No), the disk I/F control unit 200 continues to execute verification of the whole area starting from the area subsequent to the area previously subjected to verification (step S1105).

If it is determined that verification of all areas have been completed (step S1103: Yes), the disk OF control unit 200 clears the contents of the area-based IO access frequency table 1201 (step S1106). After clearing the contents of the area-based IO access frequency table 1201, the disk I/F control unit 200 ends the prioritized verification processing of the high access areas and returns to normal online verification processing.

<Verification of Area Having Long IO Access Time>

Next, a prioritized online verification processing of the area having a long access time will be described with reference to FIG. 13. The processing of FIG. 13 replaces the process of step S1101 of FIG. 11 with step S1301. That is, step S1101 of FIG. 11 compares the access frequency of each area (number of accesses or number of accesses per unit time) with threshold AC_th1 to determine whether the disk I/F control unit 200 should execute verification or not.

Figure 13:
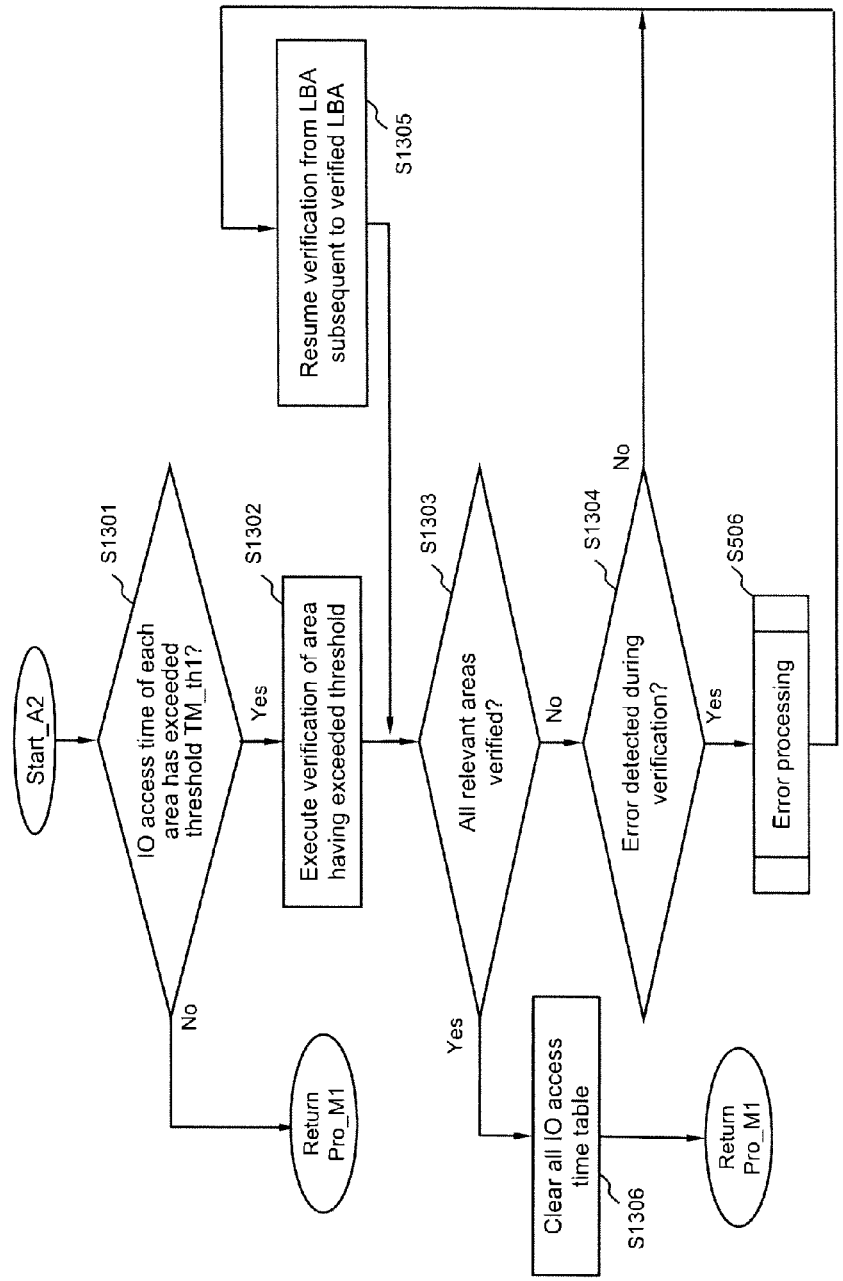
FIG. 13 is a flowchart showing a prioritized verification processing of an area where access time is long according to the present invention.

In the process of FIG. 13, the access time of each area (area-based IO access time table 1202) is compared with threshold TM_th1 to determine whether the disk I/F control unit 200 should execute verification or not. Further, when it is determined that verification of all areas is completed, the contents of the area-based IO access time table 1202 is cleared instead of the area-based IO access frequency table 1201 in step S1306. The processes of step S1302 and subsequent steps of FIG. 13 are the same as the processes of step S1102 and subsequent steps of FIG. 11.

<Verification of High IO Access Frequency Areas and Long Time IO Access Areas>

Figure 14:
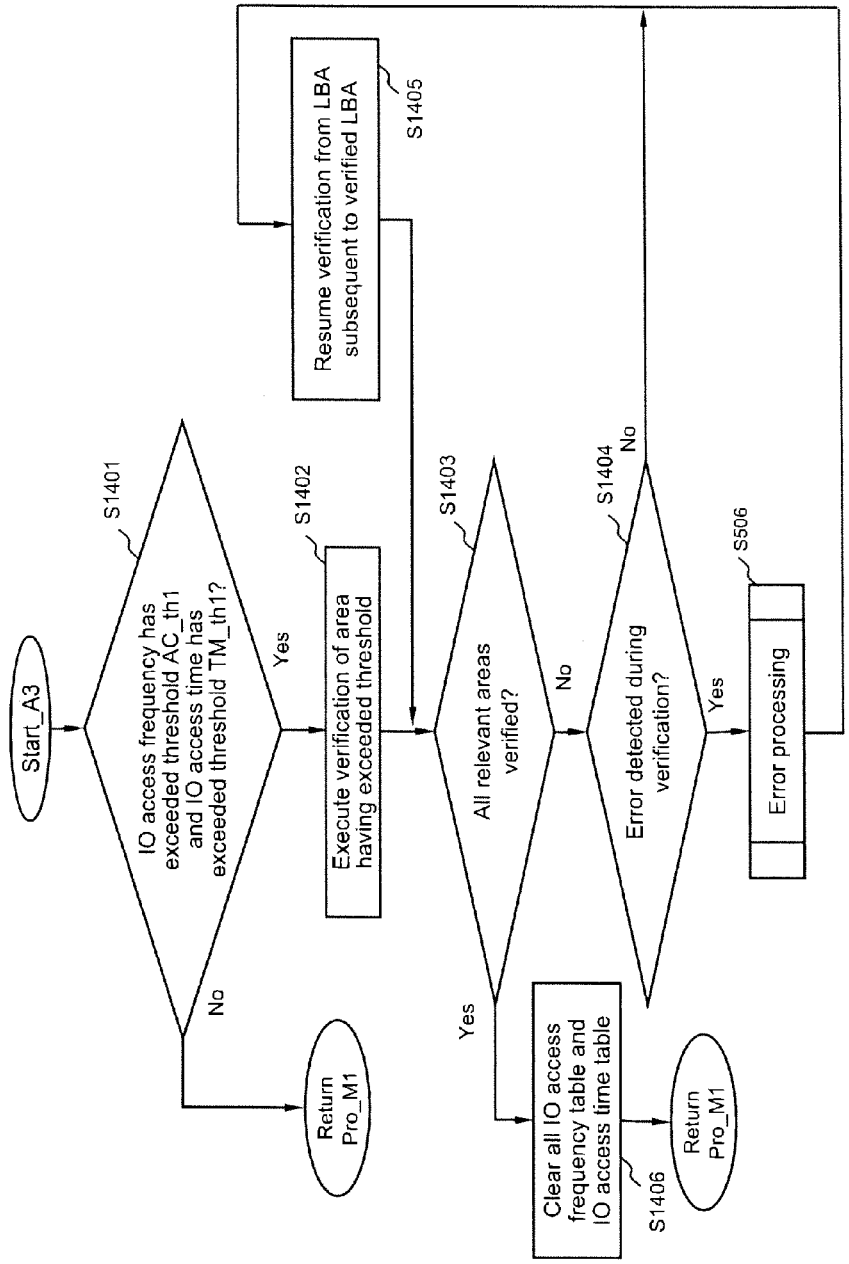
FIG. 14 is a flowchart of a prioritized verification processing performed to an area where access frequency is high and access time is long according to the present invention.

Next, the process of prioritized verification of each area based on access frequency and access time will be described with reference to FIG. 14. The process of FIG. 14 replaces step S1101 of FIG. 11 and step S1301 of FIG. 13 with step S1401. The disk I/F control unit 200 executes verification when the two following conditions are satisfied, that is, the access frequency of each area (area-based IO access frequency table 1201) has exceeded threshold AC_th1 and the access time of each area (area-based IO access time table 1202) has exceeded threshold TM_th1. The present process determines that the areas having a high access frequency from the host computer 30 and also having a long access time takes up a long time to complete a single access. In other words, there is a possibility that the access time of the area is increased by having a large number of access retries mentioned earlier performed to the HDD, so verification is performed in prioritized manner to the area so as to execute detection and restoration of errors. In step S1406, the disk I/F control unit 200 clears the contents of both the area-based 10 access frequency table 1201 and the area-based IO access time table 1202.

The determination on whether to execute verification in step S1401 can be varied so that the disk I/F control unit 200 executes verification when either one of the conditions is satisfied, that is, when the access frequency of each area (area-based 10 access frequency table 1201) has exceeded threshold AC_th1 or the access time of the area (area-based IO access time table 1202) has exceeded threshold TM_th1. The present process enhances the data reliability and access performance by determining the location where errors are possibly hidden not only based on high access frequency but also based on long access time so as to execute detection and restoration of errors.

As described, prioritized online verification can be executed to areas and LBAs having a high IO access frequency, or to areas and LBAs having a long IO access time. Therefore, even before the time for performing normal online verification, online verification can be executed when a large amount of access occurs, according to which errors can be detected without fail. Thereby, the reliability of data and the access performance can be enhanced.

<Long-Time Continuous Online Verification>

According to the prior-art normal online verification, verification of each area of the HDD is performed periodically. However, as mentioned earlier, since data is recorded highly densely in the HDD, the increase in storage capacity of the HDD is greater than the reduction of time for executing a single verification of the HDD, and the interval in which verification processing is performed to each area has been elongated. The verification interval may become even longer by executing the "intense verification of the circumference of the error-detected LBA" or the "prioritized verification of high access areas" according to the present invention described above. Therefore, the present invention enables to shorten the interval in which verification processing is performed to each area via "long-time continuous verification". The long-time continuous verification executes the periodically-performed verification processing continuously for a long time, so as to reduce the verification complete time of all areas and to shorten the interval in which verification is executed to a specific area. Moreover, in replacement of the long-time continuous online verification processing, it is possible to perform a long length online verification processing. A long length online verification processing refers to an online verification processing performed by elongating the length of the LBA being included in a command for demanding online verification processing. That is, for example, according to a normal online verification, a command for instructing online verification designates a single LBA at a time, but on the other hand, according to the long length online verification processing, a command for demanding online verification designates five LBAs at a time. According to the long length online verification processing, the online verification processing of five LBAs can be performed via a single command instead of via five commands, according to which online verification processing can be performed to more LBAs within the same time. As a result, the online verification processing of all areas can be completed more quickly, and the interval in which online verification processing is performed to each area can be shortened.

Further, when verification is executed continuously for a long time, a response delay of storage modules (such as HDDs and SSDs) occur at an interrupt timing of data processing or the like from the host computer, for example. Further, if long-length verification processing is performed, the load for processing commands is increased or the execution time of a single command is elongated, so that during the processing, there is no interrupt timing of data processing or the like from the host computer, for example, and a response delay from the storage module (such as HDD and SSD) occurs. Therefore, the IO accesses from the host computer 30 to the storage subsystem 1 or to the storage modules within the storage subsystem 1 are managed statistically. Based on the management information, the disk I/F control unit 200 executes a continuous online verification for a long time (hereinafter referred to as long time continuous verification) at a period of time when IO access frequency is determined to be small. Thus, the online verification can be performed at high speed without influencing the data processing performance from the host computer.

<Time-Based IO Access Frequency Measurement>

Figures 15, 16:
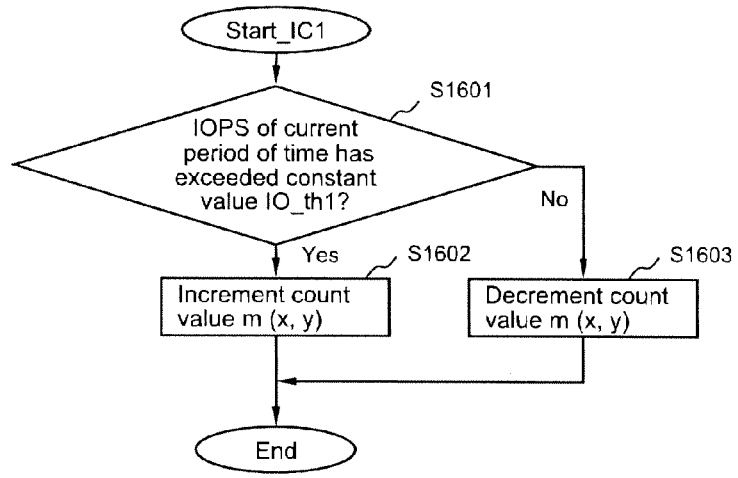
FIG. 15 is a view showing a configuration example of a time-based IO access frequency table according to the present invention.
FIG. 16 is a flowchart of update processing of the time-based IO access frequency table according to the present invention.

The actual method thereof will be described with reference to FIGS. 15 to 19. The following description takes the long time continuous online verification processing as an example, but long length online verification processing can also be performed by replacing the "long time continuous verification" with "long length online verification" and by replacing a "predetermined length LL1" and "predetermined length LL2" with "predetermined time TT1". First, the method for statistically managing accesses to the storage subsystem 1 or to the storage modules (such as HDDs and SSDs) within the storage subsystem 1 from the host computer will be described with reference to FIGS. 15 and 16. FIG. 15 shows a time-based IO access frequency table 1501, which divides the days of the week into periods of time, wherein the frequency of IO accesses from the host computer 30 to the storage subsystem 1 are measured and managed for each of the divided periods of time. The measured value is shown as count value m (x, y) (x: period of time, y: day of week), and the value measured during an update processing of the time-based IO access frequency table of FIG. 16 is stored as the count value m (x, y).

The actual process of measurement will now be described. The disk I/F control unit 200 monitors accesses from the host computer 30 to the storage subsystem 1 or HDD (SAS HDD 21, SSD 22 and SATA HDD 23 of FIG. 2) and counts the number of accesses. The measurement is performed for each period of time, and the unit determines whether an IOPS (Input/Output Per Second) which is the measured access frequency for each period of time exceeds a constant value IO_th1 or not (step S1601).

If the access frequency IOPS exceeds a constant value IO_th1 (step S1601: Yes), the disk I/F control unit 200 increments a count value m (x, y) corresponding to the current day of the week and current period of time in the time-based IO access frequency table 1501 (step S1602). On the other hand, if the frequency has not exceeded the constant value IO_th1 (step S1601: No), the disk I/F control unit 200 decrements the count value m (x, y) (step S1603). The constant value IO_th1 is a value either determined uniquely by the drive type of the HDD or the SSD or determined by the administrator or the like.

As described, the count value m (x, y) of each day of the week and each period of time is measured for a certain period of time (such as three months, for example). The period of time of the day of the week where IO access frequency is low (or high) can be specified based on the count value m (x, y). The count value m (x, y) is a value greater than "0" and smaller than IO_max, and if the value is decremented (in step S1601) when the count value m (x, y) is "0", the value will not become "−1 and remains "0". Further, if the value is incremented (in step S1602) when the count value m (x, y) is IO_max, the value remains IO_max. The constant value IO_max is a value either determined uniquely by the drive type of the HDD or SSD or determined by the administrator or the like.

<Operation of Long-Time Continuous Verification>

Next, the process of long-time continuous verification processing will be described with reference to FIG. 17. First, the disk I/F control unit 200 determines whether long-time continuous verification has been executed to maximum LBA 6108 in the verification status management table 610 shown in FIG. 6 for each drive (step S1701). If long-time continuous verification has been executed (step S1701: Yes), the disk I/F control unit 200 ends the long-time continuous verification processing and returns to normal online verification processing.

If long-time continuous verification is not executed (step S1701: No), the disk I/F control unit 200 determines whether or not the value of the count value m (x, y) corresponding to the current day of the week and current period of time is below a constant value (IO_max/2) or not (step S1702). If the count value m (x, y) is not below a constant value (IO_max/2) (step S1702: No), the disk I/F control unit 200 ends the long-time continuous verification processing and returns to normal online verification processing. If the count value m (x, y) is below a constant value (IO_max/2) (step S1702: Yes), the disk I/F control unit 200 determines whether the current access frequency is below the constant value (IO_max/2) or not (step S1703). If the past access frequency (IOPS) satisfies a constant condition (below IO_max/2), if the current access frequency is greater than a constant level, the control unit determines that long time continuous verification may affect accesses from the host computer and suppresses verification.

If the current access frequency exceeds a constant value (IO_max/2) (step S1703: No), the disk I/F control unit 200 ends the long-time continuous verification processing and returns to the normal online verification processing. If the current access frequency is below the constant value (IO_max/2) (step S1703: Yes), the disk I/F control unit 200 starts executing the long-time continuous verification, the verification starting from the LBA of "0" or from the LBA subsequent to the last verified LBA 6109 in the verification status management table 610 (or initial LBA 6111 of the verification status management table 610) to the LBA number of constant value LL1 (or to the end LBA 6112 in the verification status management table 610) (step S1704).

Next, the disk I/F control unit 200 determines whether an error has been detected or not (step S1705), and if an error has been detected (step S1705: Yes), the disk I/F control unit 200 executes the error processing S506. If an error has not been detected (step S1705: No), the disk I/F control unit 200 repeatedly performs step S1701 and subsequent steps. The time or the constant value LL1 defined by the number of LBAs for performing the long-time continuous verification can be determined in advance by the storage subsystem 1, can be varied according to the status of use of the system, or can be set by the administrator similar to n (x, y) of FIG. 18.

<Long-Time Continuous Verification Execution Schedule Table>

FIG. 18 shows a long-time continuous verification execution schedule table 1801, which is a table on whether to execute week-time based verification or the operation time for executing verification set by the administrator. In n (x, y)=z of the table, x represents period of time, y represents day of week and z represents execution time. For example, n (1, 1)=1 shows that verification is performed for one hour from 0 o'clock to 6 o'clock on Monday. If verification is not to be performed, no actual number n (x, y) will be set, and "NULL" is entered.

The period of time for executing verification can be further divided and managed as shown in the long-time continuous verification execution schedule table 1802. For example, verification is scheduled to be performed for one hour from 0 o'clock to 1 o'clock on Mondays as shown via n (1, 1)=1. On Tuesdays where verification is scheduled as n (1, 2)=1, verification can be executed continuously for one hour from 0 o'clock to 1 o'clock, from 1 o'clock to 2 o'clock and from 2 o'clock to 3 o'clock, respectively. On Saturdays where verification is scheduled as n (1, 6)=3, verification can be executed one hour at a time in a dispersed manner from 0 o'clock to 1 o'clock, from 1 o'clock to 2 o'clock and from 5 o'clock to 6 o'clock. On Sundays where verification is scheduled as n (1, 7)=5, verification can be set to be executed for a total of 5 hours from a period of time of 0 o'clock to 6 o'clock. As described, the administrator can set the period of time and the execution time for performing verification arbitrarily. Instead of setting the execution time, the administrator can set the number of LBAs for executing verification to n (x, y).

<Operation of Long-Time Continuous Verification>

Figure 19:
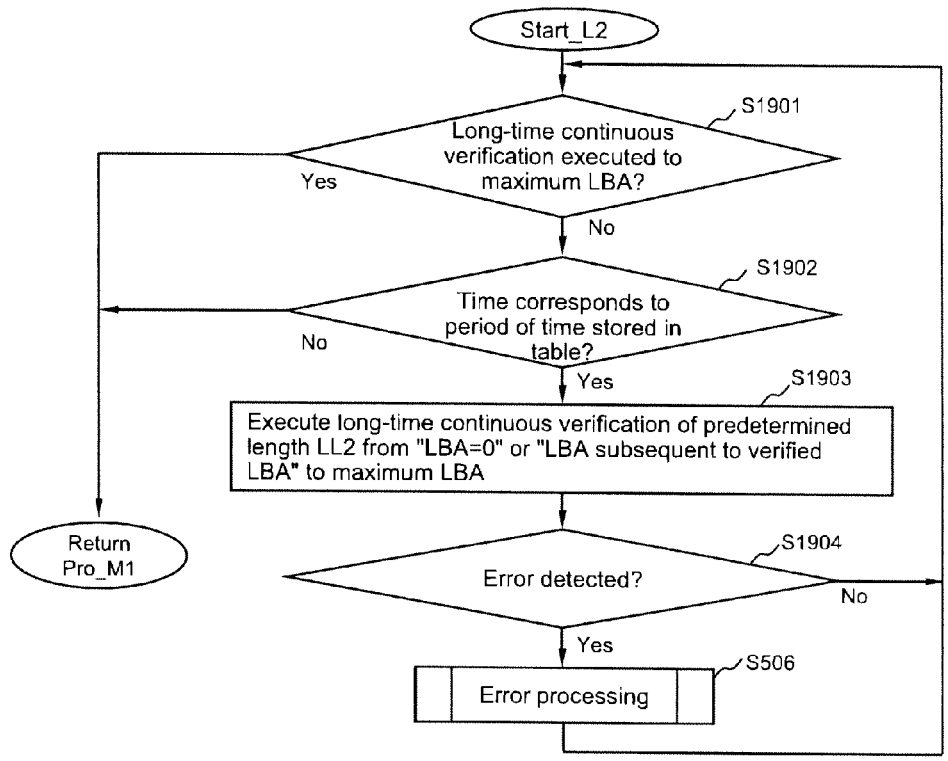
FIG. 19 is a flowchart showing the long-time continuous verification according to the present invention.

Next, the operation of long-time continuous verification using a long-time continuous verification execution time management table 1801 will be described with reference to FIG. 19. First, the disk I/F control unit 200 determines whether long-time continuous verification has been executed to the maximum LBA 6108 in the verification status management table 610 (FIG. 6) with respect to each drive (step S1901). If long-time continuous verification has been executed (step S1701: Yes), the disk I/F control unit 200 ends the long-time continuous verification processing and returns to the normal online verification processing.

When long-time continuous verification is not executed (step S1901: No), the disk I/F control unit 200 determines whether the value of n (x, y) corresponding to the current day of the week and period of time is stored in the long-time continuous verification execution time management table 1801 or not (whether "NULL" is entered or not) (step S1902). If the value is stored in the table and the current time corresponds to the period of time for executing verification, the disk I/F control unit 200 starts execution of the long-time continuous verification of the predetermined length LL2 (set value of n (x, y)). The processes after starting verification are the same as FIG. 17.

<Hybrid Online Verification Processing>

<Intensive Verification of Circumference of Error-Detected LBA and Long-Time Continuous Verification>

Figure 11:
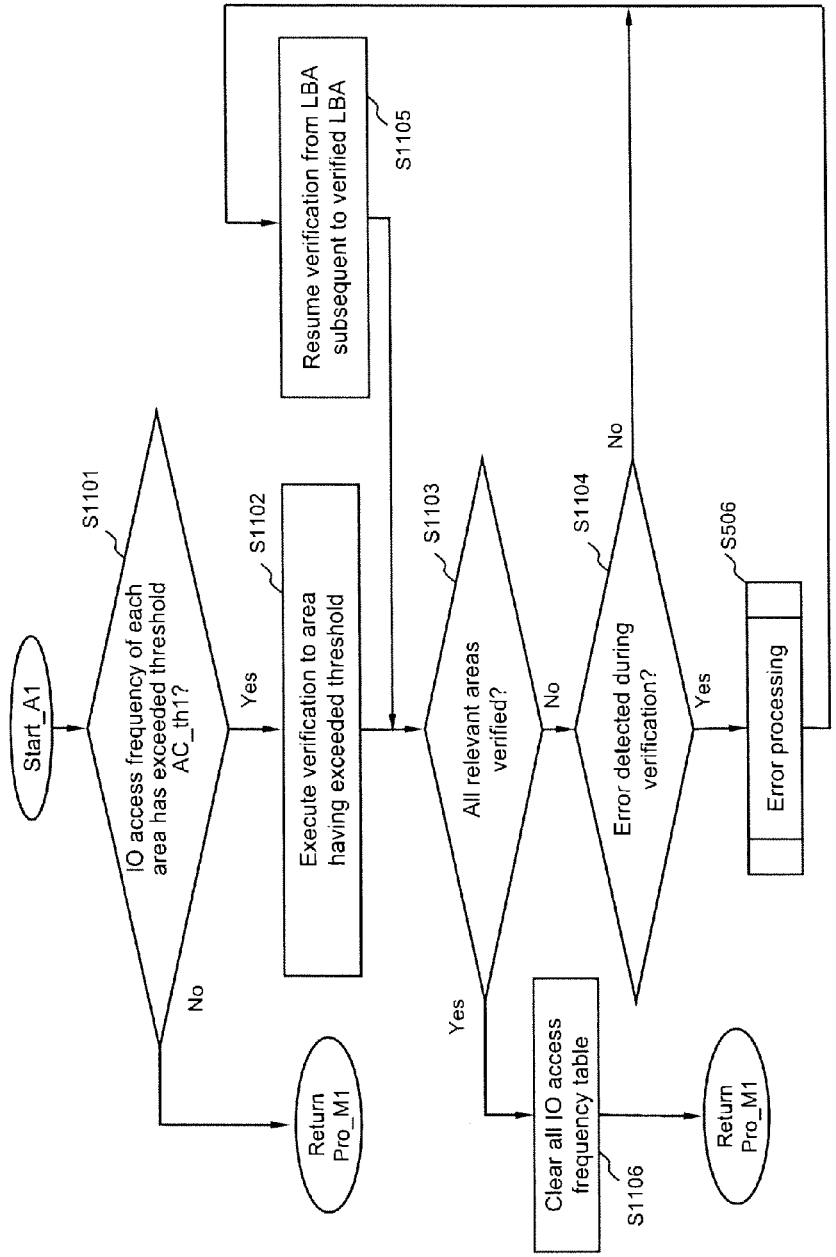
FIG. 11 is a flowchart showing a prioritized verification processing according to the present invention performed to an area where access frequency is high.
Figure 17:
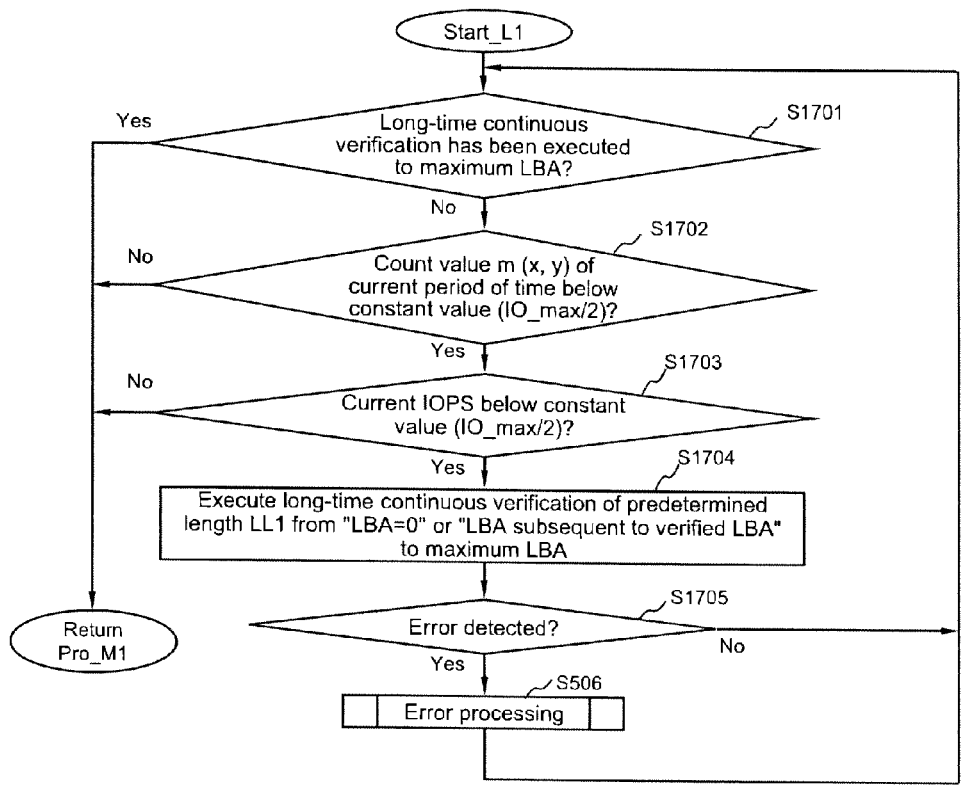
FIG. 17 is a flowchart of a long-time continuous verification according to the present invention.

Next, we will describe as another embodiment of the intelligent online verification processing of the present invention a hybrid online verification processing having combined the intensive verification of the circumference of the error-detected LBA shown in FIG. 11 and the long-time continuous verification of FIG. 17. According to this processing, in addition to the normal online verification executing verification evenly across the whole area within a fixed period of time, when error has occurred during IO access, intensive verification is executed to the circumference of the error-detected LBA as shown in FIG. 11, and during a period of time where IO access frequency is low, the long-time continuous verification as shown in FIG. 17 is performed. Various verification processes are combined and executed in order to verify all areas of all HDDs speedily and efficiently so as to realize enhancement of high reliability of the whole storage subsystem and enhancement of access performance.

Figure 20A:
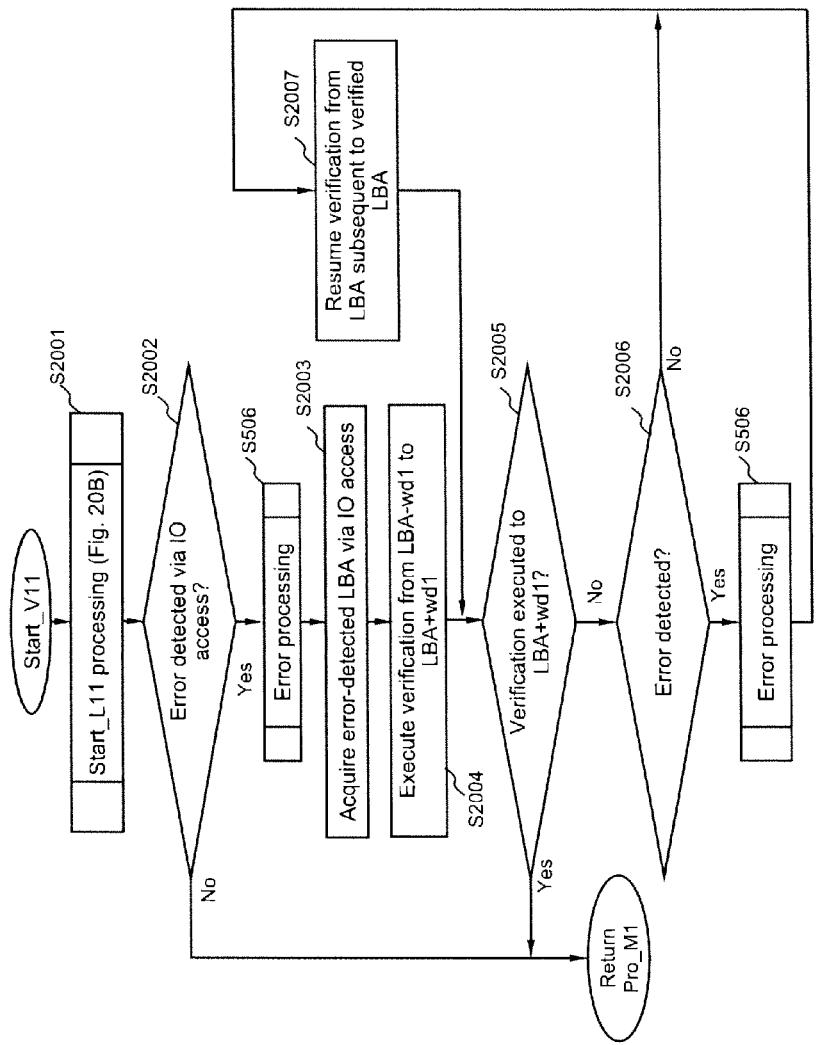
FIG. 20A is a flowchart of a hybrid verification processing having combined the intensive verification of the circumference of the error-detected LBA and the long-time continuous verification according to the present invention.
Figure 20B:
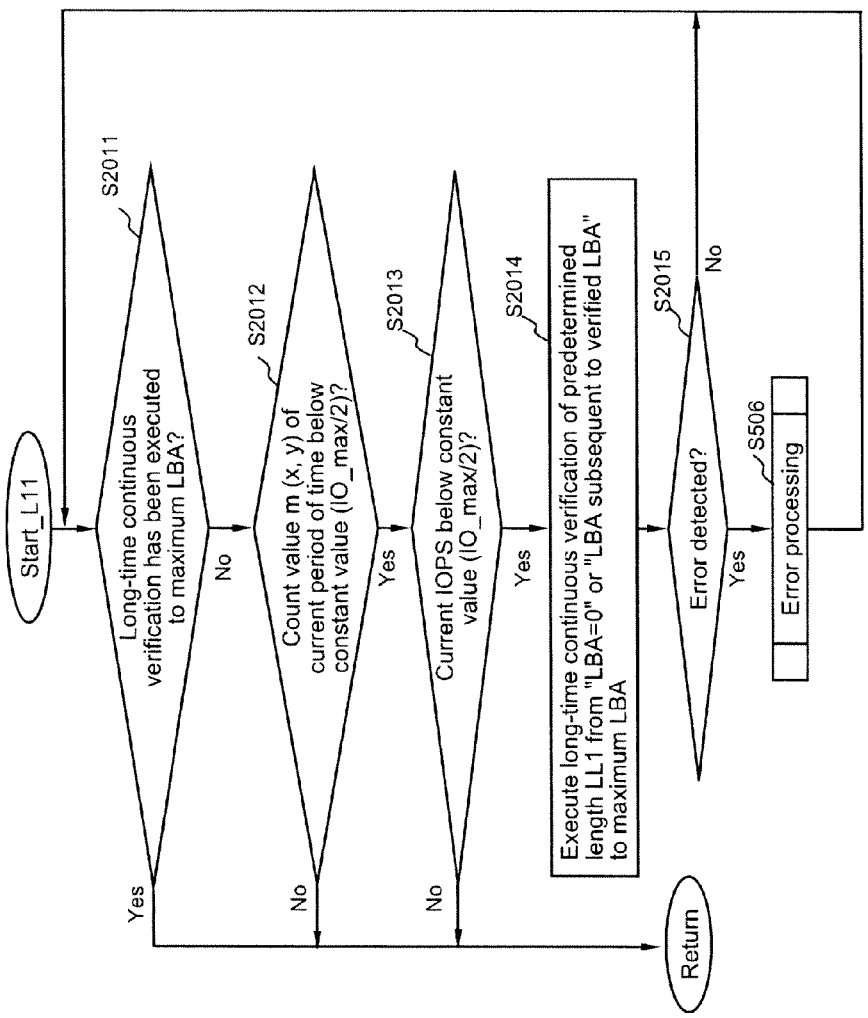
FIG. 20B is a flowchart of the long-time continuous verification according to the present invention.
Figure 20C:
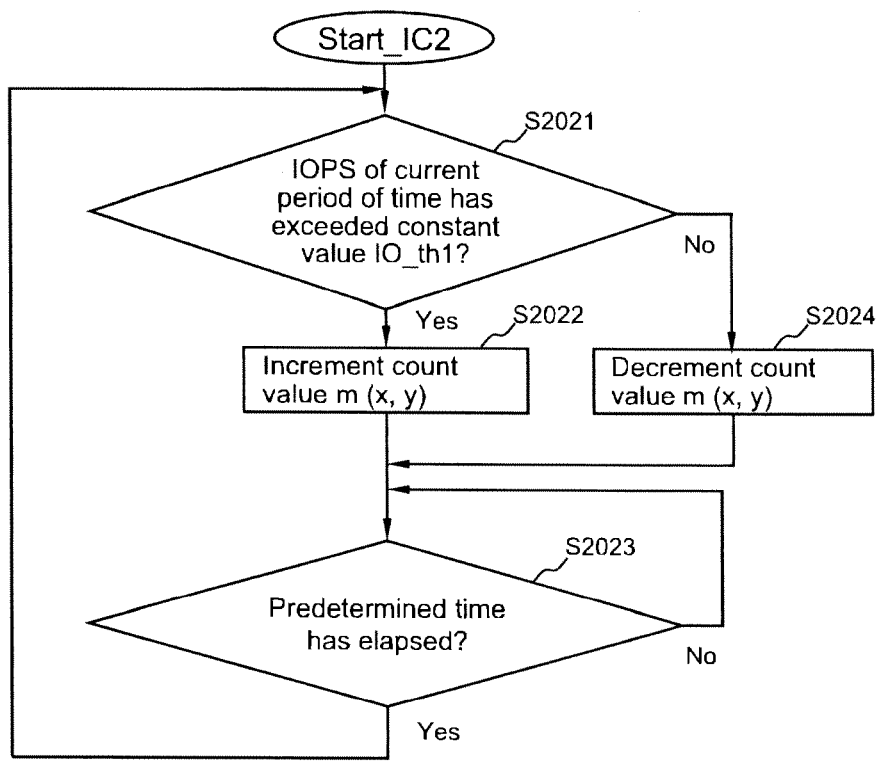
FIG. 20C is a flowchart showing the update processing of the time-based 10 access frequency table according to the present invention.

At first, the operation for updating the time-based IO access frequency table 1501 will be described with reference to FIG. 20C. In the update processing of the time-based IO access frequency table 1501 shown in FIG. 16, the disk I/F control unit 200 measures the access frequency per period of time and the count value m (x, y) has been updated once depending on whether the measured value has exceeded a threshold value IO_th1 or not. In the process of updating the time-based IO access frequency table 1501 in FIG. 20C, the disk I/F control unit 200 measures the IO access frequency of each fixed time for each period of time, and updates the contents of the table for a plurality of times based on the measurement results.

The disk I/F control unit 200 monitors and measures accesses from the host computer 30 to the storage subsystem 1 (SAS HDD 21, SSD 22 and SATA HDD 23 of FIG. 2). The measurement is executed for each period of time, and the unit determines whether the IOPS (Input/Output Per Second) within the period of time being measured has exceeded a constant value IO_th1 or not (step S2021). If the measured value has exceeded the constant value IO_th1 (step S2021: Yes), the disk I/F control unit 200 increments (+1) the count value m (x, y) corresponding to the current day of the week and current period of time in the IO access frequency table 1501 (step S2022).

On the other hand, if the measured value does not exceed the constant value IO_th1 (step S2021: No), the disk I/F control unit 200 decrements (−1) the count value m (x, y) (step S2024). Next, after updating the count value m (x, y), the disk I/F control unit 200 determines whether a certain time has elapsed or not. If a certain time has not elapsed (step S2023: No), the unit waits until the certain time has elapsed.

If a certain time has elapsed (step S2023: Yes), the disk I/F control unit 200 executes the updating operation from step S2021 again. As described, the disk I/F control unit 200 repeatedly performs update at certain time intervals within each period of time, and updates the count value m (x, y) of the time-based IO access frequency table 1501. In the verification of FIGS. 20A and 20B, the disk I/F control unit 200 determines whether or not long-time continuous verification should be executed using the count value.

Next, the overall verification processing will be described with reference to FIGS. 20A and 20B. At first, the disk I/F control unit 200 determines whether to perform long-time continuous verification or not in step S2001 of FIG. 20A (executing the process of FIG. 20B). The determination method is the same as FIG. 17, wherein from steps S2011 to S2013 of FIG. 20B, the disk I/F control unit 200 determines whether long-time continuous verification has been executed to the maximum LBA or not, compares the count value m (x, y) and the current IOPS value and the threshold IO_max/2), and as a result, determines whether or not to perform long-time continuous verification.

When the disk I/F control unit 200 determines that long-time continuous verification should be performed, the disk I/F control unit 200 executes verification and detects errors in steps S2014 and S2015, and restores the detected errors via error processing S506. Even during this long-time continuous verification, TO accesses from the host computer 30 to the storage subsystem 1 occur. Therefore, the disk I/F control unit 200 performs detection of errors during IO access and restoration of the same in the process of step S2002 and subsequent steps. The processes of step S2002 and subsequent steps of FIG. 20A are the same as the intensive verification of the circumference of the error-detected LBA shown in FIG. 7.

As described, speedy and efficient verification can be performed without affecting the accesses from the host computer 30 by combining various verification processes, such as the normal online verification, the intensive verification of the circumference of the error-detected LBA and the long-time continuous verification.

<Continuous Verification of Low-Access Area and Prioritized Verification of High-Access Area>

Figure 21A:
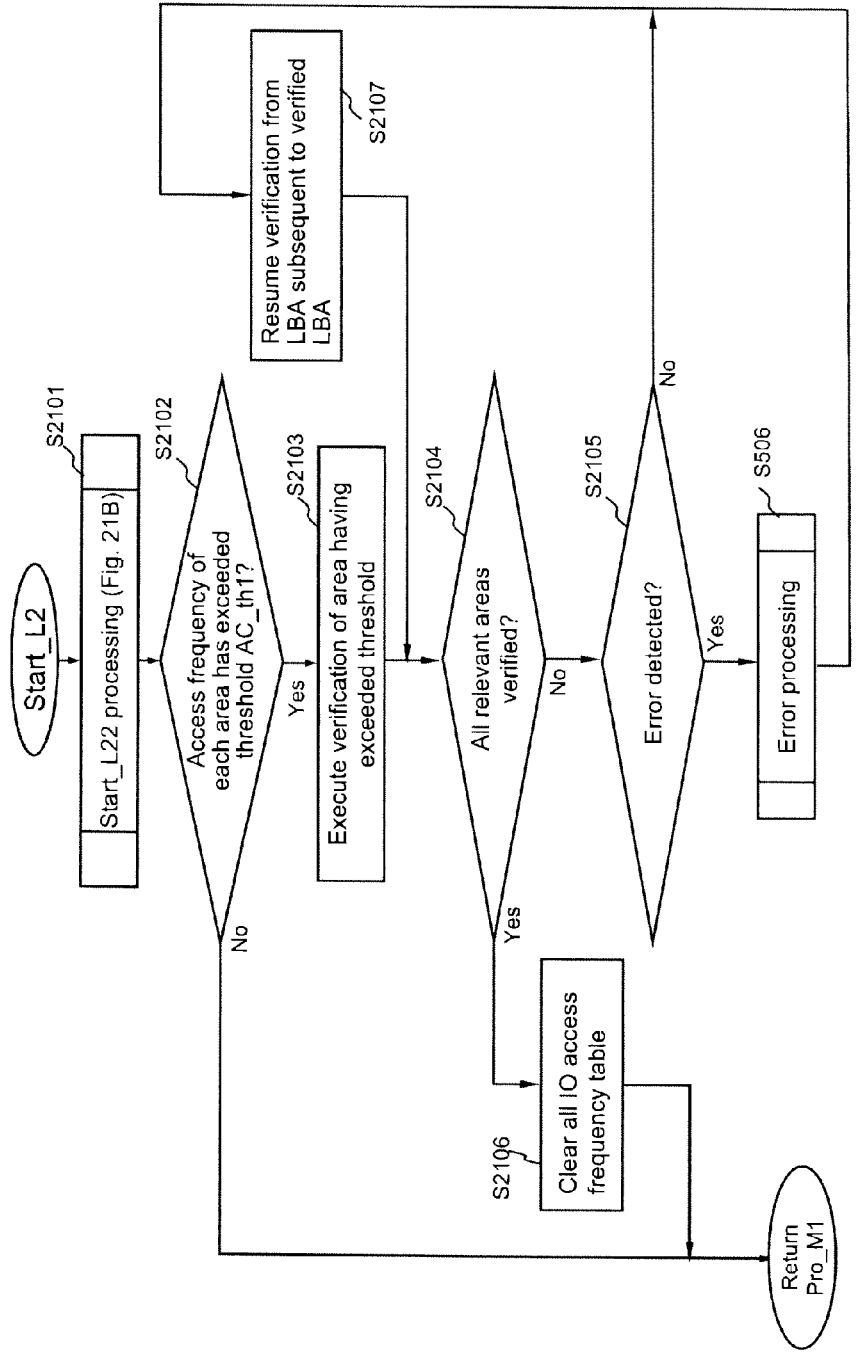
FIG. 21A is a flowchart of a hybrid verification processing having combined the prioritized verification of a high access area and the long-time continuous verification of a low access area according to the present invention.

Next, a hybrid verification processing having combined the long-time continuous verification to an area having a low access frequency and the prioritized verification to an area having a high access frequency will be described with reference to FIGS. 21A and 21B. According to this process, speedy verification can be performed efficiently to all the areas of the HDDs while preventing occurrence of an area where verification frequency becomes extremely low, by combining various verification processes so as to enhance the reliability of the whole storage subsystem and the access performance.

Figure 21B:
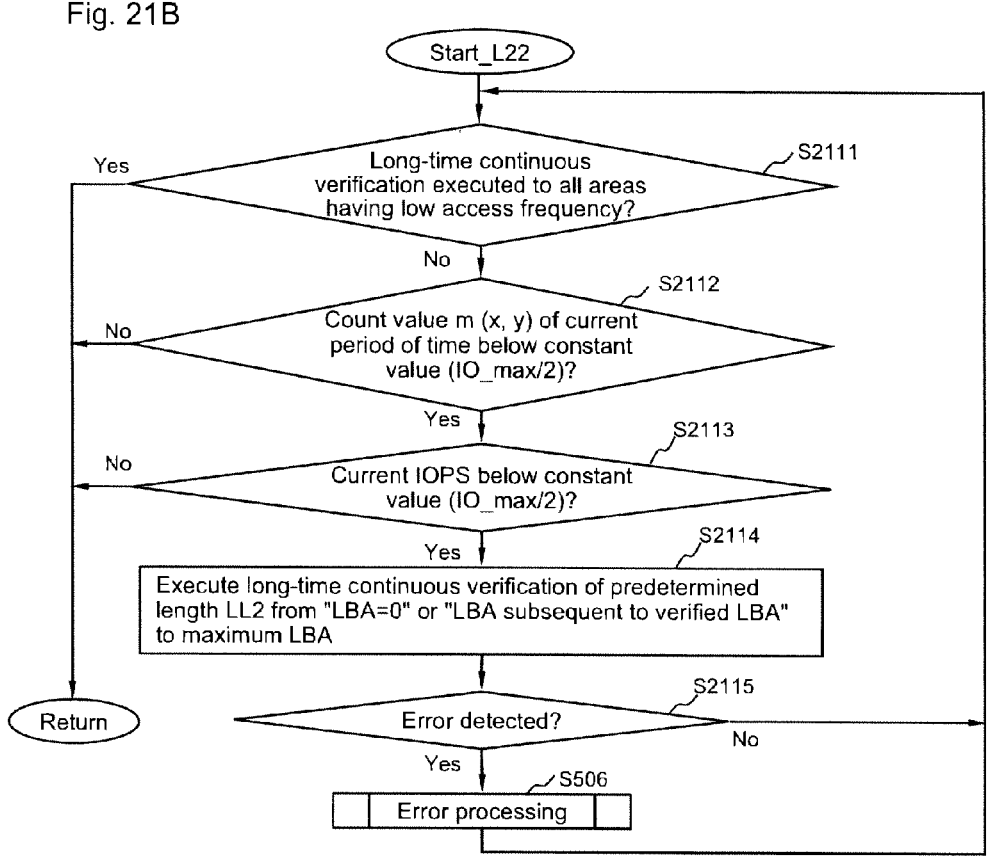
FIG. 21B is a flowchart of the long-time continuous verification processing performed to the low access area according to the present invention.

First, the disk I/F control unit 200 determines whether to perform long-time continuous verification or not in step S2101 (execution of subroutine of FIG. 21B). Actually, the disk I/F control unit 200 determines whether long-time continuous verification has been executed to all areas having low access frequency (step S2111), compares the count value m (x, y) and the threshold (IO_max/2) (step S2112), and compares the current IOPS value and the threshold (IO_max/2), so as to determine whether long-time continuous verification should be performed or not.

If the disk I/F control unit 200 determines that long-time continuous verification should be executed (if execution is not performed to all areas and the two values are below the threshold), the disk I/F control unit 200 performs verification processing of the number of LBAs having a predetermined length LL2 (set value of n (x, y)) (step 2114), determines whether error has been detected or not (step S2115), and restores the error of the section where error has been detected in S506. The predetermined length LL2 can also be a fixed value determined in advance by the storage subsystem 1.

Even during long-time continuous verification, accesses from the host computer 30 to the storage subsystem 1 occur, so the disk I/F control unit 200 measures the access frequencies of each area. If the access frequency of each area exceeds a threshold (AC_th1) (step S2102: Yes), the disk I/F control unit 200 starts the verification processing of step S2103 and subsequent steps to all the areas having exceeded the threshold. The verification processing of step S2103 and subsequent steps is the same as the process of step S1402 and subsequent steps of FIG. 14.

As described, the LBAs and areas having high IO access frequencies tend to have higher possibility of defects, but on the other hand, defects can be detected easily by detecting errors via IO accesses since there are frequent accesses. Therefore, by performing long-time continuous verification processing by selecting a certain period of time to LBAs and areas having a low IO access frequency where errors are not easily detected via IO accesses, defects can be detected more reliably without affecting the accesses from the host computer 30.

<Inhibition of Verification of Unallocated Areas>

In thin provisioning, no data of the host computer 30 or the like is stored in the areas of a physical device unallocated to (unused by) the virtual area. In addition, since there is no data written in the unallocated areas, there is no need to perform online verification thereto. Therefore, by omitting verification of the unused areas of the physical device, it becomes possible to perform efficient verification. This process of determining the allocation status of pages (real areas) to virtual areas through the thin provisioning function to determine whether to perform verification of the physical devices (HDDs and SSDs) will be described with reference to FIG. 22.

Figure 22:
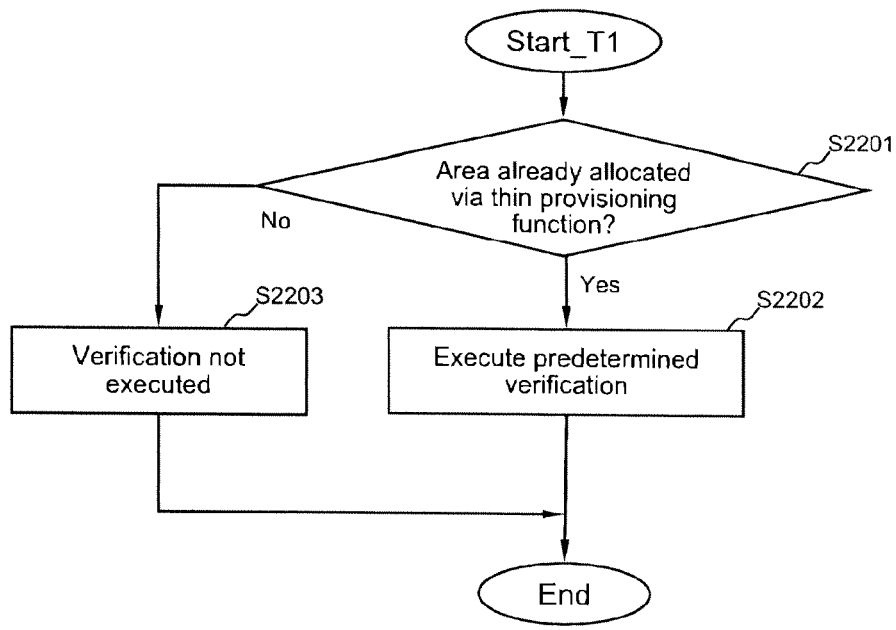
FIG. 22 is a flowchart for inhibiting verification of areas unallocated to pages according to the present invention.

FIG. 22 is a flowchart describing the inhibition of verification to areas unallocated to pages. First, the disk I/F control unit 200 determines whether an area of a physical device is used or not based on the dynamic addressing table 72 (FIG. 3A) and the logical device—physical device management table 82 (FIG. 4) stored in the shared memory 450 (step S2201).

Actually, a page 710b (capacity of 64 KB) in which the logical initial LBA is "0x00000010" in LDEV pool #1 (where the LDEV pool number is "1") is allocated to the virtual area 710a of the virtual LDEV 71 of FIG. 3A. An area worth a capacity of 64 KB having an HDU number "1" and starting from the initial LBA of "0x10000000" of FIG. 4 is allocated to the page 710b, and data is stored in the HDD. This area corresponds to the allocated area via the thin provisioning function (where the physical device is in a used state).

On the other hand, page 714b (capacity of 64 KB) of LDEV pool #1 (where the LDEV pool number is "1") of FIG. 3A does not have any information showing the corresponding relationship with the virtual areas 710a, 711a and so on of the virtual LDEV 71 in the dynamic addressing table 72, and similarly, does not have any information in the logical device—physical device management table 82 of FIG. 4. This area corresponds to the unallocated area of the real area via the thin provisioning function (where the physical device is in a non-used state).

As described, the disk I/F control unit 200 determines whether the area of the physical device is a used area or not based on the dynamic addressing table 72 (FIG. 3A) and the logical device—physical device management table 82 (FIG. 4) stored in the shared memory 450. As a result of the determination, if the area to be subjected to verification processing has a real area allocated thereto and uses a physical device (step S2201: Yes), the online verification processing is executed (step S2202). If the area is unallocated (unused) (step S2201: No), the verification processing is not executed (step S2203).

As described, by omitting the verification processing to the area of the physical device unallocated (unused) to the virtual area, it becomes possible to shorten the time for completing the verification processing, determine the error sections at an early stage and increase the access occupation time. Thus, the access performance of the host computer 30 can be enhanced.

<Setting of Verification Time when Long-Time Continuous Verification is Invoked>

Next, the operation for setting the execution information such as the verification execution time and number of LBAs for issuing a long-time continuous verification will be described with reference to FIG. 23. When long-time continuous verification is invoked during normal online verification processing, the time for executing verification is set for each area by the administrator. In other words, the execution time of long-time continuous verification can be set arbitrarily upon determining whether the area is allocated or unallocated via the aforementioned thin-provisioning function to thereby realize effective and high speed verification.

Actually, the disk I/F control unit 200 determines in step S2301 whether long-time continuous verification has been invoked or not. When the disk I/F control unit 200 determines that verification has been invoked (step S2301: Yes), the administrator sets up the verification execution time. After the administrator sets up the execution time, the disk I/F control unit 200 starts the long-time continuous verification (step S2302). On the other hand, if the verification has not been invoked (step S2301: No), the disk I/F control unit 200 ends the process without executing any processes.

Next, a hybrid verification processing having combined the "inhibition of verification in unallocated areas" of FIG. 22 considering the allocation status of areas via the thin-provisioning function and the "setting of verification time when long-time continuous verification is invoked" of FIG. 23 will be described with reference to FIGS. 24 and 25.

<Setting of Verification Time when Long-Time Continuous Verification is Invoked>

FIG. 24 is a flowchart describing the operation of the hybrid verification processing. First, the disk I/F control unit 200 determines whether the area is allocated to a real area via the thin-provisioning function or not based on the dynamic addressing table 72 (FIG. 3A) and the logical device—physical device management table 82 (FIG. 4) stored in the shared memory 450 (step S2401). If the area is an unallocated area (step S2401: No), the disk I/F control unit 200 ends the process without performing verification of the relevant area, and waits for the process of FIG. 24 to be started again via a next trigger.

If the area subjected to determination is an allocated area (step S2401: Yes), the disk I/F control unit 200 determines whether long-time continuous verification has been invoked or not (step S2402). If it is determined that long-time continuous verification is not invoked (step S2402: No), the disk I/F control unit 200 returns to the normal online verification executed via the controller unit 111 (step S2403). If it is determined that long-time continuous verification is invoked (step S2402: Yes), the disk I/F control unit 200 starts execution of the long-time continuous verification via the verification execution time set by the administrator (step S2405).

The contents of the process are summarized in a verification execution management table 2501 of FIG. 25. In the verification execution management table 2501, if the status of allocation of the area via the thin-provisioning function is not considered, when normal online verification is invoked, the controller unit 111 performs the normal online verification, and when a long-time continuous verification is invoked, the disk I/F control unit 200 performs long-time continuous verification. When long-time continuous verification is invoked, the verification execution time is fixed regardless of the area being subjected to verification.

Further, if only the status of allocation of the area via the thin-provisioning function is considered via the verification management table 2501, the disk I/F control unit 200 and the controller unit 111 only perform the normal online verification and the long-time continuous verification to the allocated area. As for the unallocated area, the controller unit 111 and the disk I/F control unit 200 neither performs normal online verification nor long-time continuous verification.

If only the invoked status of the long-time continuous verification is considered and the status of allocation of the area via the thin-provisioning function is not considered in the verification execution management table 2501, the controller unit 111 or the disk I/F control unit 200 performs normal online verification or long-time continuous verification. Incidentally, the execution time of the long-time continuous verification can be set arbitrarily by the administrator.

Lastly, if both the status of allocation of the area via the thin-provisioning function and the invoked status of the long-time continuous verification are considered, the controller unit 111 performs normal online verification of the allocation area when normal online verification is invoked, while the disk I/F control unit 200 performs long-time continuous verification of the allocation area when long-time continuous verification is invoked. The execution time of the long-time continuous verification can be set arbitrarily by the administrator.

As described, efficient verification processing is enabled by considering the allocated/unallocated status via thin-provisioning function and the state of long-time continuous verification, and further additionally setting the long-time continuous verification execution time.

INDUSTRIAL APPLICABILITY

The present invention can be applied to information processing apparatuses such as large-scale computers, general-purpose computers and servers, and to storage apparatuses such as storage systems.

REFERENCE SIGNS LIST

1 Storage subsystem
10 Disk controller unit
11 Controller chassis
12 Basic disk chassis (DKU (Disk Unit))
13 Expansion disk chassis
20 Disk unit
21 SAS HDD
22 SSD
23 SATA HDD
30 Host computer
40 Network
71 Virtual LDEV
72 Dynamic addressing table
73, 74 Logical device pool
81 Logical device
82 Logical device—physical device management table
83 Physical device
84 HDU
85 LDEV
91 IO access
92, 95 Error LBA section
93, 96 Error restoration
94, 97, 98, 99 Verification
100 Host I/F control unit
111, 112 DKC (Disk Controller)
200 Disk I/F control unit
300 Cache memory
400 CPU (Central Processing Unit)
430 Local memory
450 Shared memory
461 Coupled line
500 Data control unit
600 SAS expander
601 Switch (SW)
610 Verification status monitor table
1201 Area-based IO access frequency table
1202 Area-based IO access time table
1501 Time-based IO access frequency table
1801, 1802 Long-time continuous verification execution time management table
2501 Verification execution management table

The invention claimed is:

1. A storage subsystem coupled with a host computer, comprising:
a memory device configured to store data from the host computer: and
a management unit configured to manage a storage area of the memory device;
wherein the management unit is configured to execute a first verification processing performed periodically at predetermined cycles to the memory device, and to execute a second verification processing that differs from the first verification processing,
wherein the second verification processing is executed to a continuous area anterior and posterior to an error section detected by an IO access from the host computer, and the second verification processing is executed when an error is detected by the IO access.

2. The storage subsystem according to claim 1, wherein when the error is detected again using the second verification processing, after restoring the error, the second verification processing is resumed from the error restored section.

3. The storage subsystem according to claim 1, wherein when the error is detected again using the second verification processing, after restoring the error, the second verification processing is resumed from a section where the second verification processing was started.

4. The storage subsystem according to claim 1, wherein the continuous area anterior and posterior to the error section configured to execute the second verification processing is determined by one of the following values:
(L1) a constant value determined in advance by the storage subsystem;
(L2) a value allocated by the type of an HDD or SSD drive constituting a memory unit;
(L3) a value designated by a system administrator;
(L4) a variable value set via a TOV (Time Out of Verification) by the system;
(L5) a variable value set via the TOV of the HDD or the SSD drive;
(L6) a variable value set via error type; and
(L7) a variable value determined by the capacity of the HDD or the SSD drive.

5. The storage subsystem according to claim 1, wherein the second verification processing is executed to an area where an IO access frequency from the host computer is high or an area where IO access time therefrom is long.

6. The storage subsystem according to claim 5, wherein the area where the IO access frequency is high or the area where the IO access time is long is determined by a count value stored in an area-based IO access frequency table composed of an area number, a count value of the IO access number and a count value of the IO access time.

7. The storage subsystem according to claim 1, wherein the second verification processing is executed continuously for a predetermined time or for a predetermined number of areas.

8. The storage subsystem according to claim 7, wherein the continuously performed verification operation is executed for a period of time when the IO access frequency is smaller than a threshold determined in advance.

9. The storage subsystem according to claim 8, wherein when the IO access frequency exceeds the threshold determined in advance during the continuously performed verification operation, the verification operation is discontinued.

10. The storage subsystem according to claim 7, wherein the continuously performed verification operation is executed based on execution information set in advance.

11. The storage subsystem according to claim 10, wherein the execution information is composed of a day-of-week information, period of time information, and execution information composed of a verification execution time or number of execution areas.

12. The storage subsystem according to claim 1, wherein the second verification processing is composed of a verification processing of a continuous area anterior and posterior to the error section determined using the IO access from the host computer and a verification processing executed continuously for a predetermined time or to a predetermined number of areas.

13. The storage subsystem according to claim 1, wherein the second verification processing is composed of a verification processing executed to an area where an IO access frequency from the host computer is high or an area where an IO access time is long, and a verification processing executed during a period of time when the IO access frequency is low.

14. The storage subsystem according to claim 1, wherein the first and second verification processings are not executed to an area unused by the storage unit.

15. A method for controlling a storage subsystem coupled with a host computer,
the storage subsystem comprising:
a memory device configured to store data from the host computer; and
a management unit configured to manage a storage area of the memory device;
the method comprising:
executing, by the management unit, a first verification processing performed periodically at predetermined cycles to the memory device; and
executing, by the management unit, a second verification processing that differs from the first verification processing,
wherein the step of executing the second verification processing comprises executing to a continuous area anterior and posterior to an error section detected by an IO access from the host computer, and the second verification processing is executed when an error is detected by the IO access.

16. The method for controlling a storage subsystem according to claim 15, wherein the step of executing the second verification processing comprises executing to an area where an IO access frequency from the host computer is high or an area where IO access time therefrom is long.

17. The method for controlling a storage subsystem according to claim 15, wherein the second verification processing comprises executing continuously for a predetermined time or for a predetermined number of areas.

18. The method for controlling a storage subsystem according to claim 15, wherein the steps of executing the first and second verification processings are not executed to an area unused by the storage unit.

* * * * *